United States Patent [19]
Imai et al.

[11] Patent Number: 5,723,928
[45] Date of Patent: Mar. 3, 1998

[54] INDUCTION MOTOR AND METHOD OF ADJUSTING POWER FACTOR OF THE SAME

[75] Inventors: Kouji Imai, 5-2003-202, Nakahira, Tenpaku-ku, Nagoya-shi, Aichi-ken; Nuio Tsuchida, 5-227-16, Kurosawadai, Modori-ku, Nagoya-shi, Aichi-ken; Yoshiyuki Shibata, Toyota, all of Japan

[73] Assignees: Toyoda Koki Kabushiki Kaisha, Kariya; Kouji Imai; Nuio Tsuchida, both of Nagoya, all of Japan

[21] Appl. No.: 536,643

[22] Filed: Sep. 29, 1995

[30] Foreign Application Priority Data

Sep. 30, 1994 [JP] Japan .................... 6-261936
Mar. 24, 1995 [JP] Japan .................... 7-091687
Apr. 14, 1995 [JP] Japan .................... 7-113760

[51] Int. Cl.⁶ ............... H02K 1/22; H02K 1/28; H02K 16/00; H02K 16/01
[52] U.S. Cl. .............. 310/114; 310/114; 310/181; 310/209; 310/266; 310/261
[58] Field of Search .................. 310/114, 266, 310/166, 172, 181, 165, 209, 90, 90.5, 261

[56] References Cited

U.S. PATENT DOCUMENTS

| | | | |
|---|---|---|---|
| 1,149,998 | 7/1915 | Inrig | 310/209 |
| 1,772,719 | 9/1930 | Johnson | 310/209 |
| 2,159,768 | 5/1939 | MacMillan | 310/114 |
| 2,492,678 | 12/1949 | Amtsberg | 310/114 |
| 2,626,366 | 1/1953 | Stoner | 310/114 |
| 3,484,635 | 12/1969 | MacKallor | 310/114 |
| 4,208,596 | 6/1980 | Popov et al. | 310/13 |
| 4,651,040 | 3/1987 | Gerstner et al. | 310/166 |
| 4,745,318 | 5/1988 | Ivanics | 310/114 |
| 5,463,263 | 10/1995 | Flynn | 310/181 |
| 5,483,111 | 1/1996 | Kuznetsov | 310/12 |

*Primary Examiner*—Thomas M. Dougherty
*Assistant Examiner*—Karl I. E. Tamai
*Attorney, Agent, or Firm*—Oblon, Spivak, McClelland, Maier & Neustadt, P.C.

[57] ABSTRACT

An induction motor capable of producing an increased torque has a stator for generating a rotating magnetic field, a stator fixed to a shaft, a cylindrical member disposed within an inner space defined by the rotor and rotatably supported by the shaft, and magnets attached to the circumference of the rotor such that the magnets face the rotating magnetic field. The induction motor may be provided with a mechanism for adjusting the effective magnetic force of the magnets. The magnets may be permanent magnets or electromagnets. Also, a synchronizing mechanism may be provided to prevent the cylindrical member from lagging behind the rotor. A linear induction motor includes a straight primary coil assembly and a straight secondary coil assembly. One of the primary coil assembly and the secondary coil assembly is movable relative to the other. Also, a plurality of magnets are disposed in the secondary coil assembly. A disc type induction motor includes a flat circular stator, a disc-shaped rotor, and a flat circular magnet disc on which a plurality of magnets are provided.

3 Claims, 27 Drawing Sheets

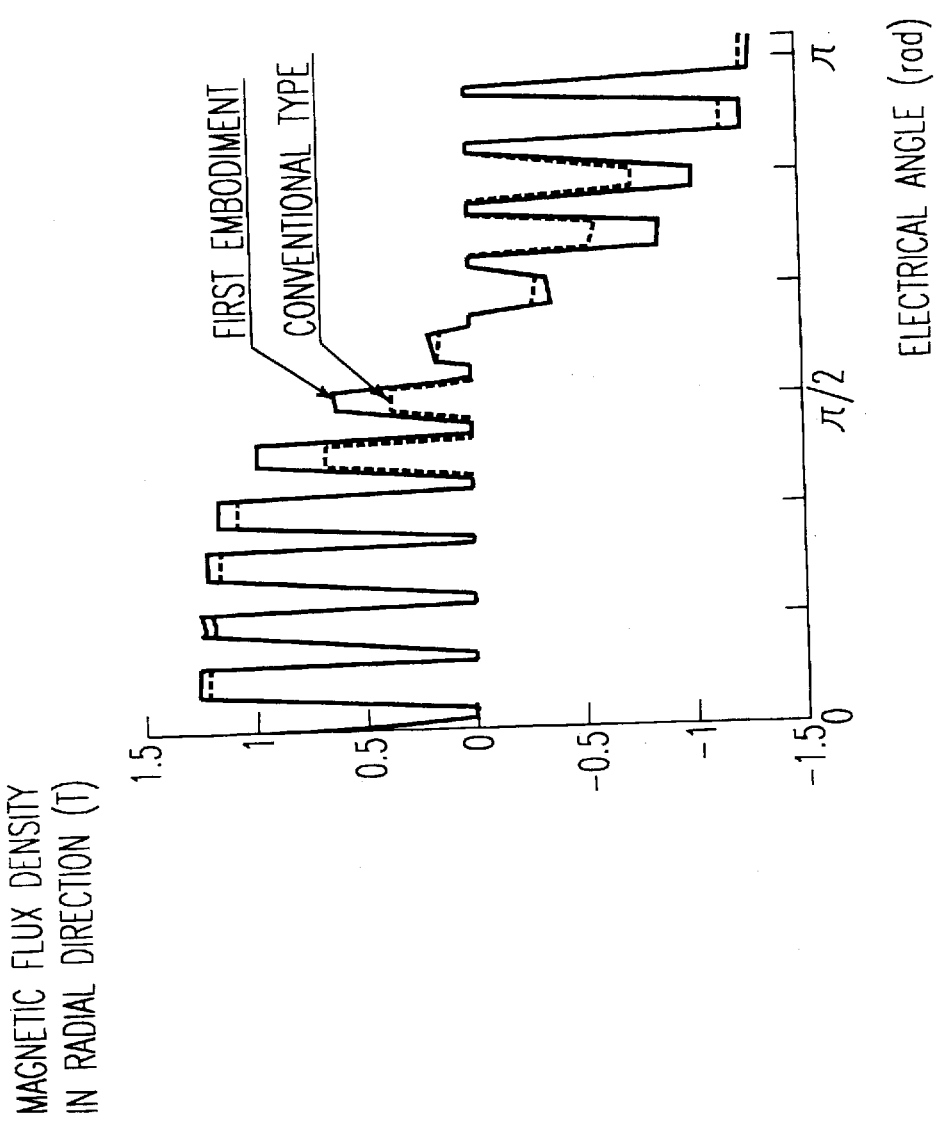

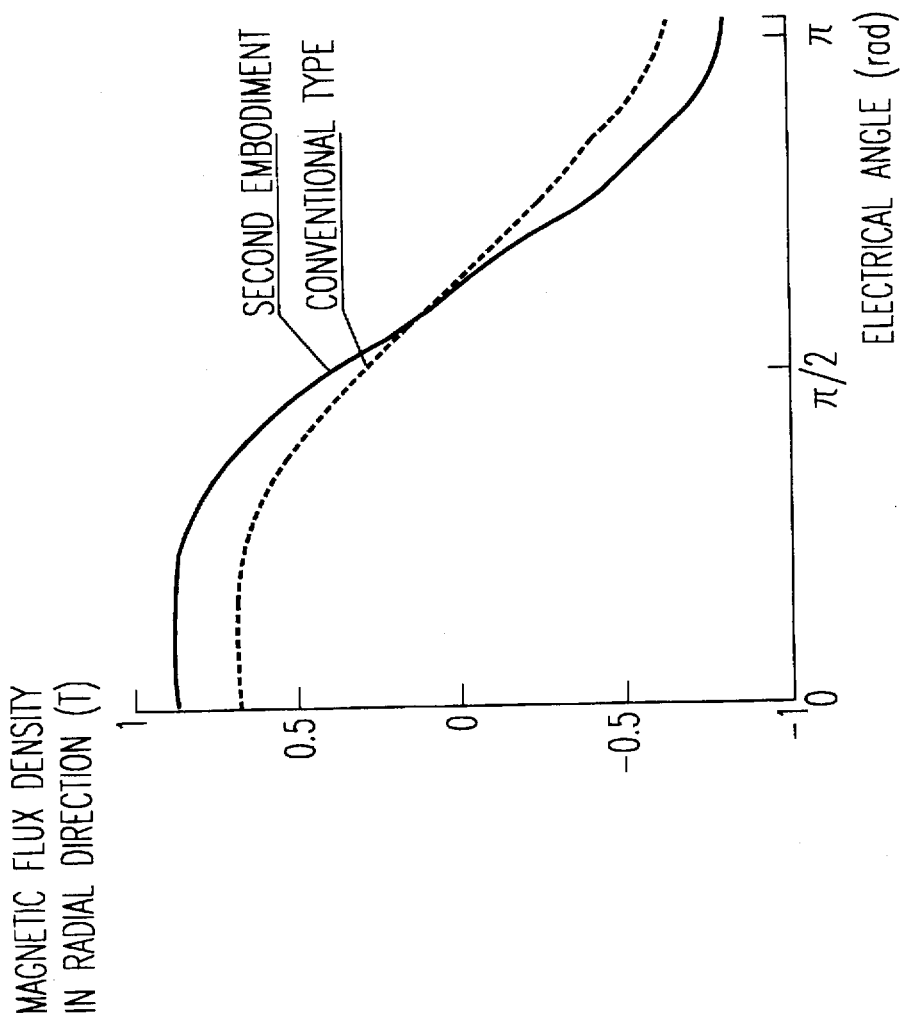

INDUCTION MOTOR AND METHOD OF ADJUSTING POWER FACTOR OF THE SAME

BACKGROUND OF THE INVENTION

1. Field of the Invention

The present invention relates to an induction motor capable of producing a large torque, and a method of adjusting the power factor of such an induction motor.

2. Discussion of Related Art

Induction motors are widely used in various industrial fields because of their durability and cheapness, and the unnecessity of speed control. Conventionally, DC motors have mainly been used in the fields in which the speed of a motor must be controlled. However, the progress of power electronics devices and the development of new control techniques such as vector control have made it possible to control the rotational speed of an induction motor. Therefore, even in the fields in which motors must be subjected to speed control, DC motors have gradually been replaced with induction motors. In an induction motor, a current is caused to flow through a primary coil assembly disposed in a stator to generate a magnetic flux. Due to this magnetic flux, an induction current is generated in a rotor, and a torque is generated due to the mutual action between the magnetic flux and the induction current.

In various fields, an induction motor capable of producing a large torque is demanded. However, only a few techniques have been proposed to increase the output torque of an induction motor by changing the structure itself. A main cause to hinder the generation of a large torque is that the magnetic flux generated by the stator does not reach the interior of the rotor, and therefore, the magnetic flux density in the radial direction, which contributes to the generation of torque, becomes small.

This phenomenon will be described with reference to FIG. 1, which shows a four-pole squirrel-cage induction motor. As shown in FIG. 1, windings 584 are provided in a stator 582 while a cage 588 having a plurality of secondary conductors 588a is provided on a rotor 586. Arrow A in FIG. 1 shows the rotational direction of the magnetic field generated by the stator 582. In such an induction motor, a line of magnetic force 590 forms a looped locus at each of poles provided on the stator 582, so that the component of the magnetic force in the radial direction becomes small in the rotor 586. Decrease of torque due to the above-described phenomenon will now be described with reference to FIGS. 2A and 2B. FIG. 2A shows the generation of a speed electromotive force at a secondary conductor G among the plurality of secondary conductors 588a which form the cage 588 provided on the rotor 586. The secondary conductor G moves at a speed v relative to magnetic flux B in a direction indicated by arrow C when the rotor 586 rotates. The speed electromotive force e at the secondary conductor G can be expressed as the product of the effective component of the magnetic flux and the velocity in accordance with the Fleming's right hand rule. The effective component of the magnetic flux is the component of the magnetic flux in a direction perpendicular to the direction of movement of the magnetic field (i.e., the radial direction of the rotor). However, since the magnetic flux deflects from the radial direction by an amount corresponding to $\cos \theta$, the effective component of the magnetic flux is expressed by $B \cdot \cos \theta$. Accordingly, the speed electromotive force e is given by the following expression:

$$e = (v \cdot B \cdot \cos \theta) \cdot L,$$

where L is the length of the secondary conductor G. In other words, the speed electromotive force e decreases by an amount corresponding to $\cos \theta$.

Next, the force F generated at the secondary conductor G will be described with reference to FIG. 2B. The current i flowing though the secondary conductor G is expressed by $i = e/R$, wherein R is the resistance of the secondary conductor G. Also, the force F generated at the secondary conductor G can be expressed as the product of the magnetic flux B and the current i caused by the speed electromotive force e in accordance with the Fleming's left hand rule, i.e., expressed by the following expression:

$$F = (i \cdot B) \cdot L = [(v \cdot B \cdot \cos \theta \cdot L)/R] \cdot B \cdot L.$$

Since the force F is generated in a direction perpendicular to the direction of the magnetic flux B, the force generated at the secondary conductor G to rotate the rotor 586 becomes the $\cos \theta$ component of the force F (the component in the tangential direction of the rotor), i.e., expressed by $F \cdot \cos \theta$. Accordingly, the generated force can be expressed as follows:

$$[(v \cdot B \cdot \cos \theta \cdot L) \cdot B] \cdot L \cdot \cos \theta = v \cdot B^2 \cdot L^{2 \cdot \cos^2 \theta}.$$

Thus, the force decreases in accordance with the square value of $\cos \theta$, which represents the deflecting angle of the magnetic flux with respect to the radial direction.

Also, the power factor of the induction motor is low due to its large inductance. Although the power factor can be increased to approximately 90%, the induction motor cannot be operated at 100% power factor (i.e., the power factor=1). Accordingly, the induction motor is not efficient in terms of power factor.

A rotor shown in FIG. 3 has been proposed in which deflection of magnetic flux is prevented to increase the output torque. In the rotor 686 shown in FIG. 3, a laminated iron core 672 is mounted on a shaft 670, and a tubular rotor member 676 which is made of copper and in which many iron wires 674 are embedded is provided around the iron core 672. Magnetic flux passes through the iron wires 674 having a small magnetic resistance, so that the magnetic flux is directed in the radial direction. As a result, the value of $\cos \theta$ approaches "1", so that the torque is increased. However, since the plurality of iron wires 674 must be radially embedded in the rotor member 676, the structure becomes complex and the costs of manufacture increase.

Also, an induction motor shown in FIG. 4 is disclosed in IEEE TRANSACTIONS ON MAGNETICS, Vol. MAG-20, No. 5, September 1984, pp. 1786–1788. In the induction motor, an additional stator is provided inside a rotor. In detail, as shown in FIG. 4, a rotor 786 supported by a hollow shaft 770A is disposed inside an outer stator 782A, and an inner stator 782B is disposed inside the rotor 786. The inner stator 782B is fixed to a shaft 770B. One end of the rotor 786 is supported by the shaft 770B via a bearing 772. A cooling fun 774 is attached to the outer circumference of the hollow shaft 770A.

Although the induction motor shown in FIG. 4 can produce an increased torque, the structure is complex and therefore, manufacture thereof is difficult, because the rotation of the rotor 786 is taken out through the hollow shaft 770A, and the rotor 786 is supported at its one end only. In addition, since electrical wires must be passed through the shaft 770B to supply electricity to the inner stator 782B, the wiring becomes difficult. The inventors of the present invention analyzed the magnetic field of the induction motor, and found that the strength of the magnetic flux generated in the outer stator 782A must be equalized to the strength of the magnetic flux generated in the inner stator 782B to generate an increased torque. However, in this case, it is necessary to decrease the thickness of the outer stator 782A, which leads to a decrease in the amount of winding, and increase the diameter of the inner stator 782B, which leads to an increase in the amount of winding. Since the amount of the winding in the outer stator 782A which corresponds to stators of conventional induction motors must be reduced, it is impossible to greatly increase the output torque compared to conventional induction motors. Although the fin 774 was provided, it was difficult to cool the inner stator 782B. Also, this induction motor can be considered as a combination motor in which a motor composed of the inner stator 782B and the rotor 786 is combined with a motor composed of the outer stator 782A and the rotor 786. In such a structure, the efficiency considerably decreases compared to conventional induction motors even though the torque can be increased. Because of these problems, neither studies nor proposals have been made for the practical use of the induction motor shown in FIG. 4.

SUMMARY OF THE INVENTION

An object of the present invention is to provide an improved induction motor which is simple and durable and which can produce an increased torque.

Another object of the present invention is to provide an induction motor having a mechanism for adjusting the power factor of the induction motor.

Still another object of the present invention is to provide a method for adjusting the power factor of the induction motor.

Yet another object of the present invention is to provide an induction motor which can produce an increased torque with reduced torque pulsation.

According to a first aspect of the present invention, an induction motor is provided which includes a stator for generating a rotating magnetic field, and a stator fixed to a shaft for rotation therewith inside the stator. The induction motor further comprises a cylindrical member which is disposed within an inner space defined by the rotor while being supported by the shaft for rotation, and magnets attached to the circumference of the cylindrical member such that the magnets face the rotating magnetic field.

With this structure, magnetic flux generated in the stator is directed toward the magnets which are opposed to the stator, so that the magnetic flux penetrates the rotor in the radial direction. Accordingly, the torque generated in the rotor, i.e., the output torque of the induction motor increases. Also, since the output torque can be increased by a simple structure, i.e., by disposing the cylindrical member with the magnet inside the rotor, the induction motor is strong and durable and can be manufactured at reduced costs. Therefore, it becomes possible to increase the output torque while maintaining the advantages of conventional induction motors, i.e., low costs, and durability.

According to a second aspect of the present invention, there is provided a method of changing the power factor of the induction motor according to the first aspect. In the method, at least one of the magnetic force of the magnets, the number of turns of the winding provided on the stator, and the frequency of a voltage applied to the winding of the stator is changed so as to adjust the power factor of the induction motor.

With this method, it becomes possible to operate the induction motor such that the power factor becomes 100%. Accordingly, the efficiency of the induction motor can be increased. In addition, the output of the induction motor can be increased. Also, when a conventional induction motor which can be operated only in a state where the power factor becomes a lagged power factor and the induction motor of the present invention are used together in a system, the power factor of the induction motor of the present invention can be adjusted such that its power factor becomes an advanced power factor in order to make the overall power factor of the entire system 100%.

According to a third aspect of the present invention, a mechanism for adjusting the power factor is further provided. This adjusting mechanism includes means for moving the magnets in the axial direction of the shaft in order to change the overlapping areas between the poles of the rotating magnetic field of the stator and the magnets.

With this structure, the power factor can be adjusted easily. Also, such an adjustment can be performed even when the induction motor is operated.

According to a fourth aspect of the present invention, the magnets in the induction motor according to the first aspect are electromagnets. In this case, the power factor of the induction motor can be easily maintained at 100% or an advanced power factor by adjusting the current flowing through the electromagnets.

According to a fifth aspect of the present invention, there is provided a linear induction motor which includes a straight primary coil assembly and a straight secondary coil assembly. One of the primary coil assembly and the secondary coil assembly is movable relative to the other, and a plurality of magnets are disposed in the secondary coil assembly such that each magnet is rotatable about a rotational axis perpendicular to the direction of relative movement between the primary and secondary coil assemblies.

Since the plurality of magnets are disposed within the secondary coil assembly, a large torque can be obtained by a simple structure. Also, the power force of the liner induction motor can be easily adjusted by changing at least one of the magnetic force of the magnets, the number of turns of the winding provided on the stator, and the frequency of a voltage applied to the winding of the stator such that the power factor falls in an advanced power factor range including a 100% power factor.

According to a sixth aspect of the present invention, there is provided a disc type induction motor which includes a stator for generating a rotating magnetic field and a disc-shaped rotor fixed to a shaft. This induction motor further comprises a magnet disc which is rotatably supported by the shaft such that the rotor is sandwiched between the stator and the magnet disc. The magnet disc comprises a plurality of magnets, which correspond to poles of the stator.

Since the plurality of magnets are disposed on the magnet disc which rotates in accordance with the rotation of the magnetic filed of the stator, a large torque can be obtained by a simple structure. Also, the power force of the disc type induction motor can be easily adjusted by changing at least one of the magnetic force of the magnets, the number of turns of the winding provided on the stator, and the frequency of a voltage applied to the winding of the stator such that the power factor falls in an advanced power factor range including a 100% power factor.

According to a seventh aspect of the present invention, synchronizing means is added to the induction motor according to the first aspect to cause the cylindrical member to follow the rotor.

With this structure, the rotation of the cylindrical member can be synchronized with the rotating magnetic field within a shortened period of time. Accordingly, torque pulsation decreases in a shortened period of time, so that the starting characteristic of the induction motor can be improved.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 8 is a graph showing the magnetic flux density in the radial direction in the squirrel-cage induction motor according to the first embodiment;

FIG. 12 is a graph showing the magnetic flux density in the radial direction in a solid rotor type induction motor according to a second embodiment of the present invention;

DETAILED DESCRIPTION OF PREFERRED EMBODIMENT

Embodiments of the present invention will now be described with reference to the attached drawings.

First Embodiment

Figure 1:
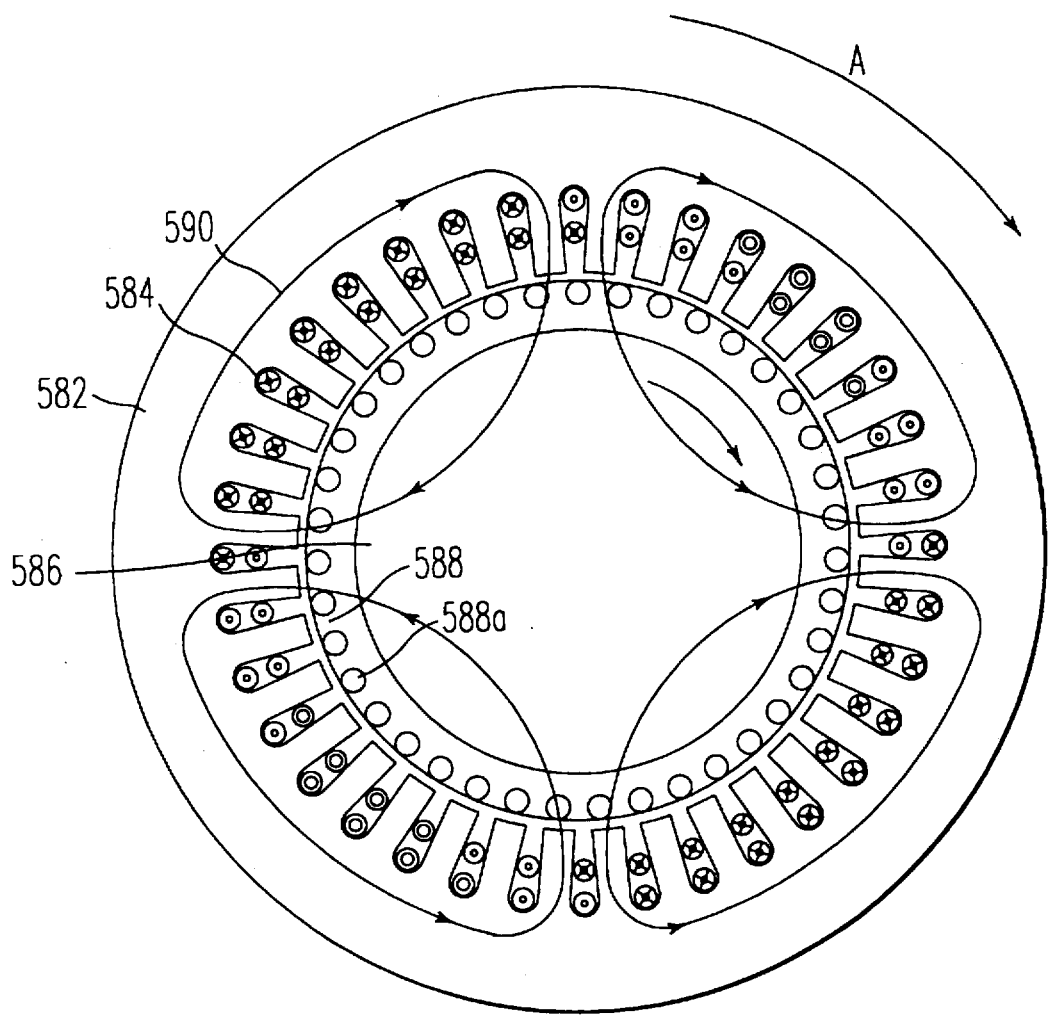
FIG. 1 is an explanatory chart showing the operational principle of a conventional induction motor.
Figure 2B:
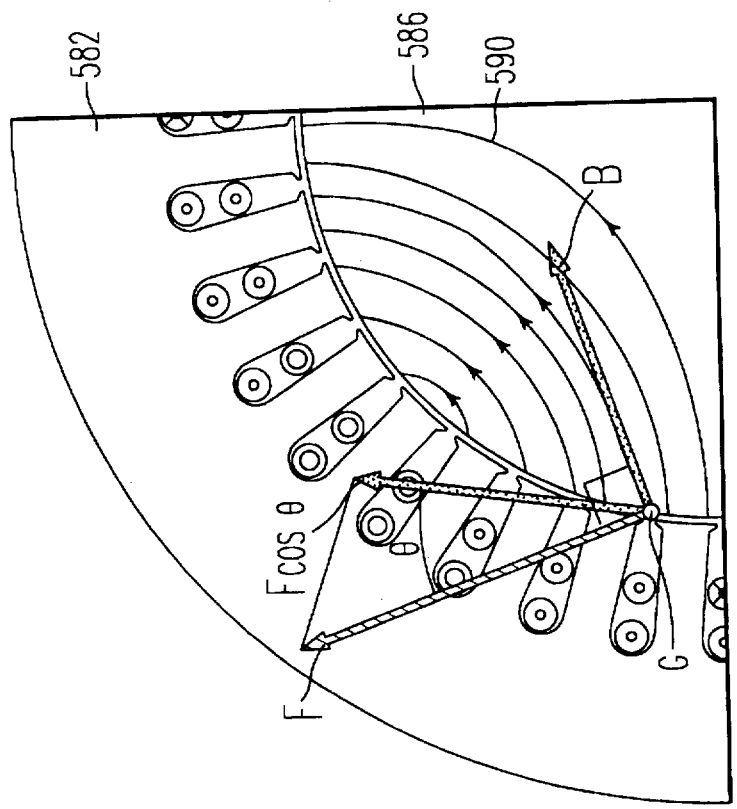
FIGS. 2A and 2B are explanatory charts for explaining the generation of a speed electromotive force and the generation of a torque, respectively, in the conventional induction motor.
Figure 2A:
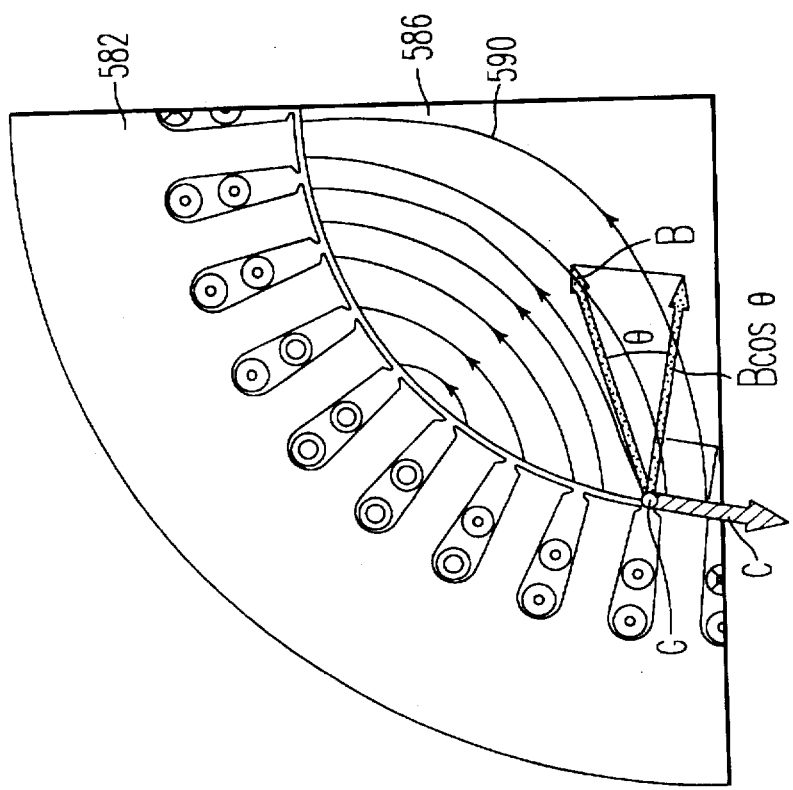
Figure 3:
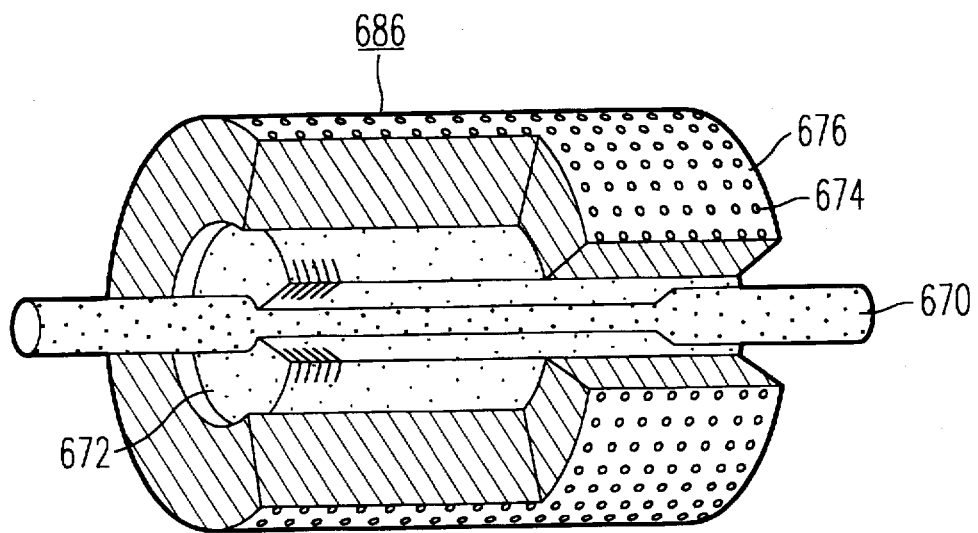
FIG. 3 is a perspective view of a rotor of a conventional induction motor which produces an increased torque.
Figure 4:
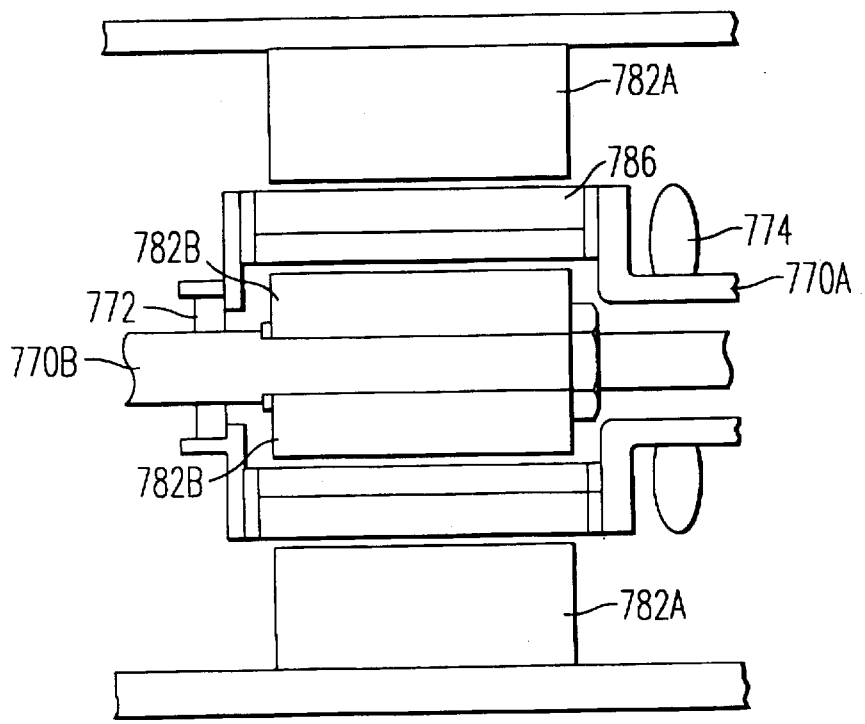
FIG. 4 is a sectional view of another conventional induction motor which produces an increased torque.
Figure 5B:
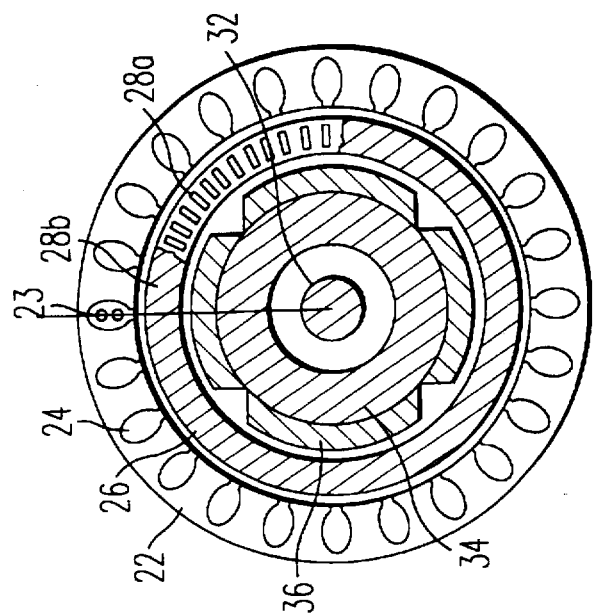
FIGS. 5A and 5B are longitudinal and transverse sectional views of a squirrel-cage induction motor according to a first embodiment of the present invention.
Figure 5A:
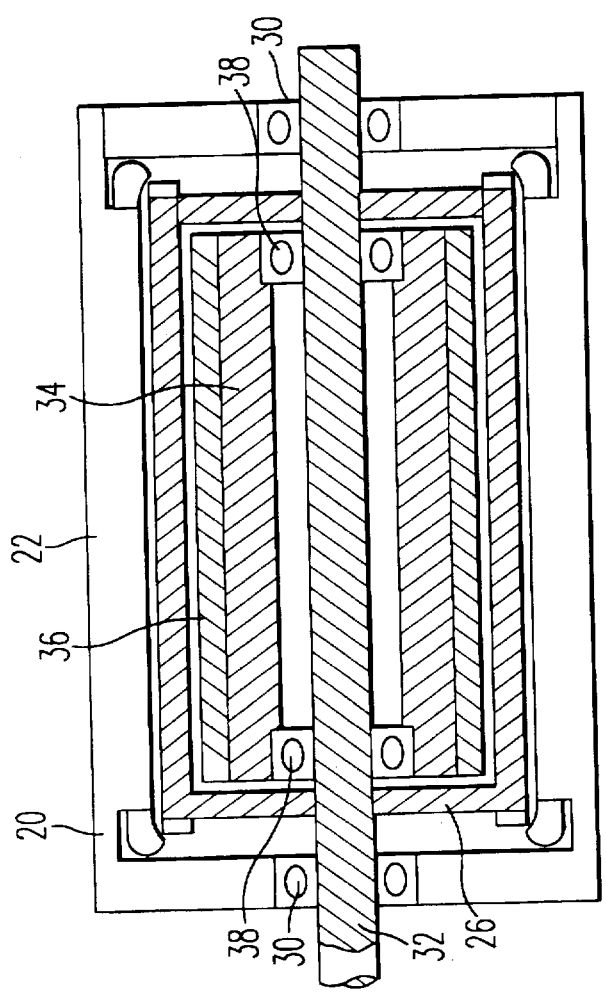

FIGS. 5A and 5B show the structure of a 400 W, three-phase, four-pole squirrel-cage induction motor 20 according to a first embodiment of the present invention.

As shown in FIGS. 5A and 5B, a plurality of slots 24 are provided in the inner circumference of a stator 22, and windings 23 are disposed in the slots 24. The stator 22 has the same structure as that of a conventional squirrel-cage induction motor, and a shaft 32 is rotatably supported by a pair of bearings 30 to be coaxial with the stator 22. A rotor 26 into which a cage is embedded is fixed to the shaft 32. As in a conventional squirrel-cage induction motor, the cage is composed of a pair of short-circuit rings 28b (only one of the short-circuit rings is shown in FIG. 5B), and a plurality of secondary conductors 28a. A cylindrical inner rotor 34 made of steel is disposed inside the rotor 26. The inner rotor 34 is supported by a pair of bearings 38 such that it is rotatable with respect to the shaft 32. Four permanent magnets 36, the number of which corresponds to the number of the poles of the squirrel-cage induction motor 20, are attached to the outer circumference of the inner rotor 34. The permanent magnets 36 are made of neodymium-iron-boron magnet. Although not illustrated, a stator frame is provided such that it surrounds the stator 22.

Figure 6:
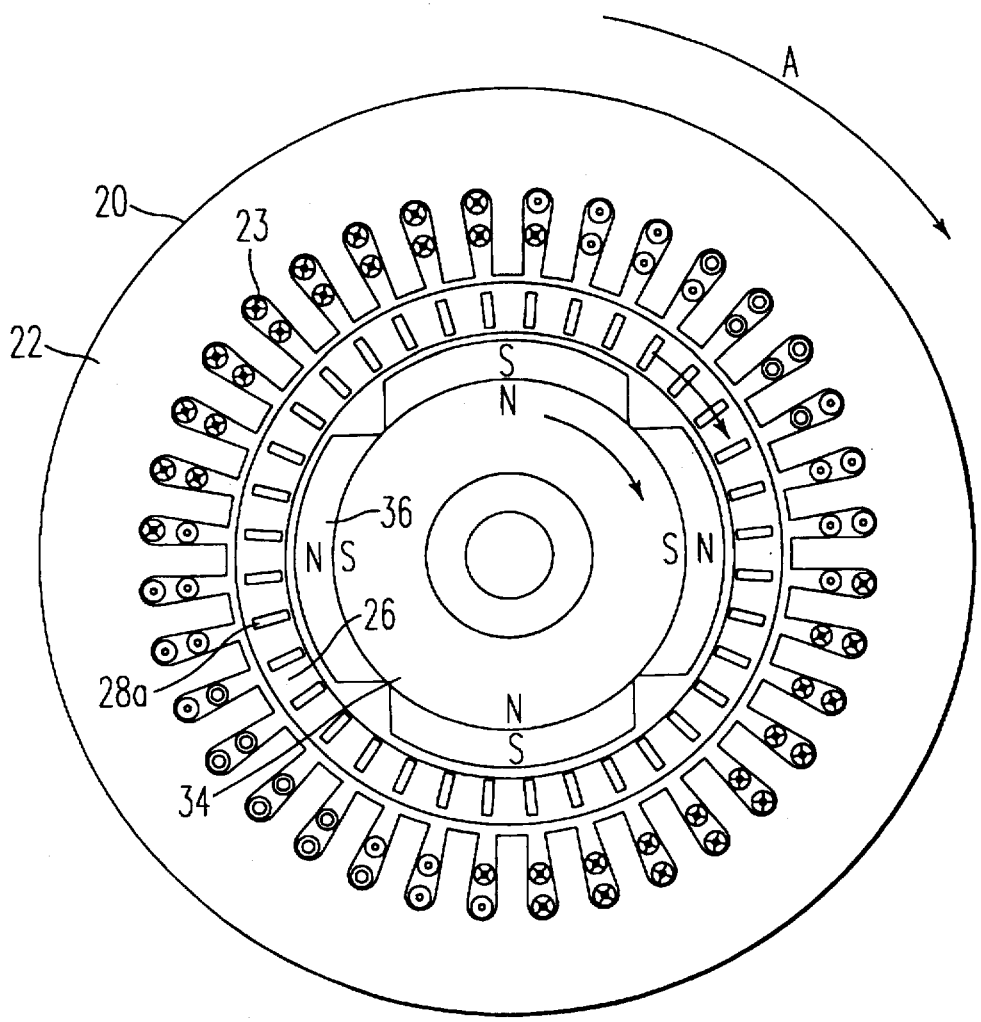
FIG. 6 is an explanatory chart showing the operational principle of the squirrel-cage induction motor according to the first embodiment.

The operation of the squirrel-cage induction motor 20 will be described with reference to FIG. 6. When three-phase alternating currents are supplied to the windings 23 of the stator 22, a magnetic field which rotates in a direction indicated by arrow A is generated. The magnetic flux of the rotating magnetic field passes across the secondary conductors 28a of the rotor 26 so that a speed electromotive force is generated in each secondary conductor 28a. As a result, a current flows due to the speed electromotive force, and a torque is generated due to the mutual action between the current and the magnetic flux so that the rotator 26 is rotated in the same direction as the direction of rotation of the magnetic field. Since a slip is produced depending on the generated torque, the rotational speed of the rotor 26 becomes slower than that of the rotating magnetic field. Meanwhile, the permanent magnets 36 are draw toward the magnetic flux generated by the stator 22, whereby the inner rotor 34 rotates synchronously with the rotating magnetic field generated in the stator 22. To be exact, the inner rotor 34 rotates with a slight angular delay. In the squirrel-cage induction motor 20, the magnetic flux is directed toward the permanent magnets 36 which are opposed to the stator 22. The magnetic flux crosses the secondary conductors 28a of the rotor 26 in the radial direction, so that the torque generated in the rotor 26 increases.

Figure 7A:
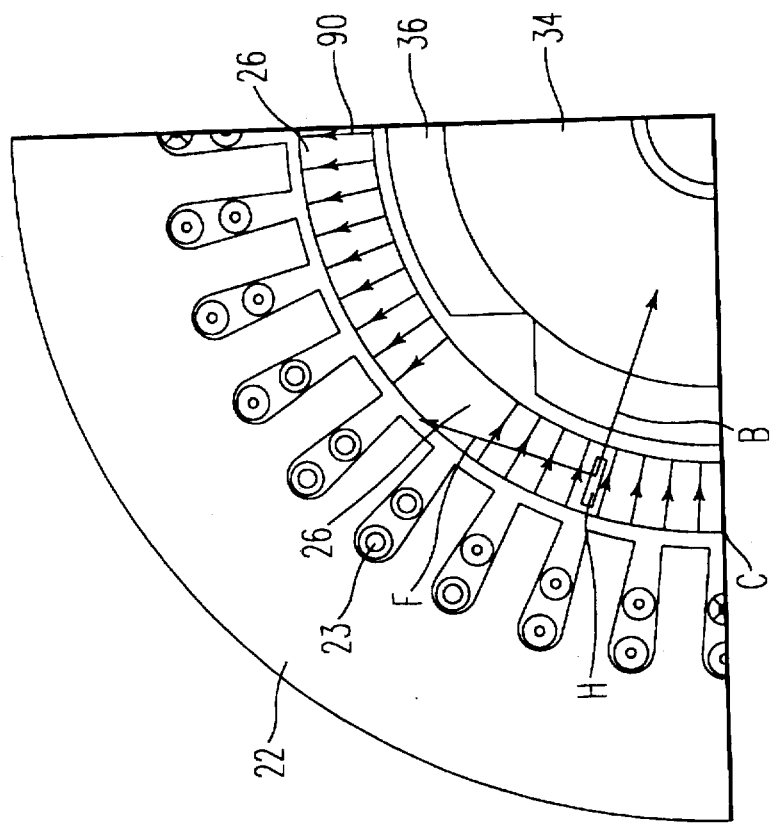
FIGS. 7A and 7B are explanatory charts for explaining the generation of a speed electromotive force and the generation of a torque, respectively, in the squirrel-cage induction motor according to the first embodiment.
Figure 7B:
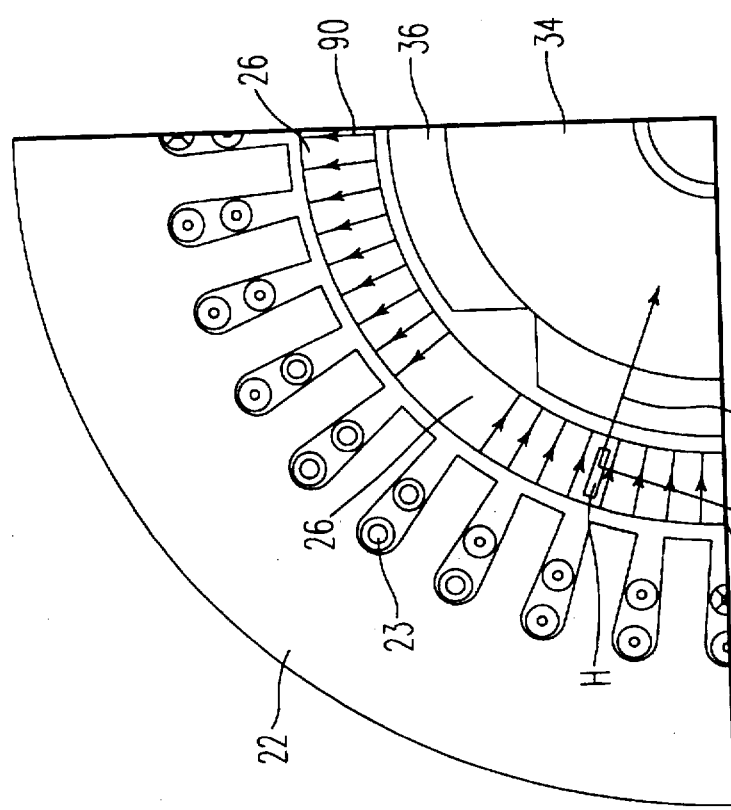

The principle of the generation of torque will be described in further detail with reference to FIGS. 7A and 7B. As shown in FIGS. 7A and 7B, lines of magnetic force 90 from the windings 23 extend toward corresponding permanent magnets 36, and lines of magnetic force 90 from the permanent magnets 36 extend toward the corresponding windings 23. That is, the magnetic flux is directed in the radial direction of the rotor 26. When it is assumed that a secondary conductor H moves at a speed v in a direction indicated by arrow C relative to the magnetic flux B due to the rotation of the magnetic field, the speed electromotive force generated in the secondary conductor H is expressed as the product of the effective component of the magnetic flux and the velocity in accordance with the Fleming's right hand rule. The effective component of the magnetic flux is the component of the magnetic flux in a direction perpendicular to the direction C of relative movement of the magnetic field (i.e., the radial direction of the rotor). Since the magnetic flux is directed in the radial direction, the whole of the magnetic flux B effectively acts on the secondary conductor H. Accordingly, the speed electromotive force e can be expressed by the following expression:

$$e = v \cdot B \cdot L,$$

where L is the length of the secondary conductor H.

Next, the force F generated at the secondary conductor H will be described with reference to FIG. 7B. The current i flowing through the secondary conductor H is expressed by i=e/R, wherein R is the resistance of the secondary conductor H. Also, the force F generated at the secondary conductor H due to the mutual action between the magnetic flux and the current can be expressed as the product of the magnetic flux B and the current i caused by the speed electromotive force e in accordance with the Fleming's left hand rule, i.e., expressed by the following expression:

$$F = (i \cdot B) \cdot L = v \cdot B \cdot L / R \cdot B \cdot L.$$

The force F is generated in a direction perpendicular to the direction of the magnetic flux B (i.e., the tangential direction of the rotor 26). That is, the force is generated in the rotational direction of the rotor 26. Accordingly, the whole of the force generated at the secondary conductors is effectively used as the torque of the rotor 26.

Next, the magnetic flux density (T) in the radial direction of the squirrel-cage induction motor 20 which was calculated based on the analysis of the magnetic field will be described with reference to the graph shown in FIG. 8. In this graph, a broken line indicates the magnetic flux density of a conventional squirrel-cage induction motor while a continuous line indicates the magnetic flux density of the squirrel-cage induction motor according to the first embodiment. The abscissa represents the electrical angle (rad) while the ordinate represents the magnetic flux density (T) in the radial direction. The conventional squirrel-cage induction motor has a stator, windings, and a cage all of which are the same as those of the squirrel-cage induction motor 20 according to the first embodiment. The squirrel-cage induction motor 20 of the present embodiment is different from the conventional squirrel-cage induction motor in that the inner rotor 34 to which the permanent magnets 36 are fixed is disposed inside the rotor 26, as has been described with reference to FIGS. 5A and 5B. As shown in the graph, the magnetic flux density becomes minimum (i.e., becomes zero) at electrical angles where the passage of the magnetic flux is prevented by the cage which has a small permeability. It is to be noted that the magnetic flux density changes like a rectangular wave with variation in the electrical angle, i.e., the magnetic flux density steeply increases and decreases in the vicinity of an electrical angle of $\pi/4$ in the squirrel-cage induction motor 20 of the present embodiment, whereas the magnetic flux density changes like a sinusoidal wave with variation of the electrical angle in the conventional induction motor. As can been seen from this graph, in the squirrel-cage induction motor 20 of the present embodiment, the magnetic flux density (T) is increased over the entire electrical angle, compared to the conventional motor. Even when the increase of the magnetic flux density is not large, the torque is greatly increased because the magnitude of the torque is proportional to the square value of the magnetic flux density in the radial direction.

Figure 9B:
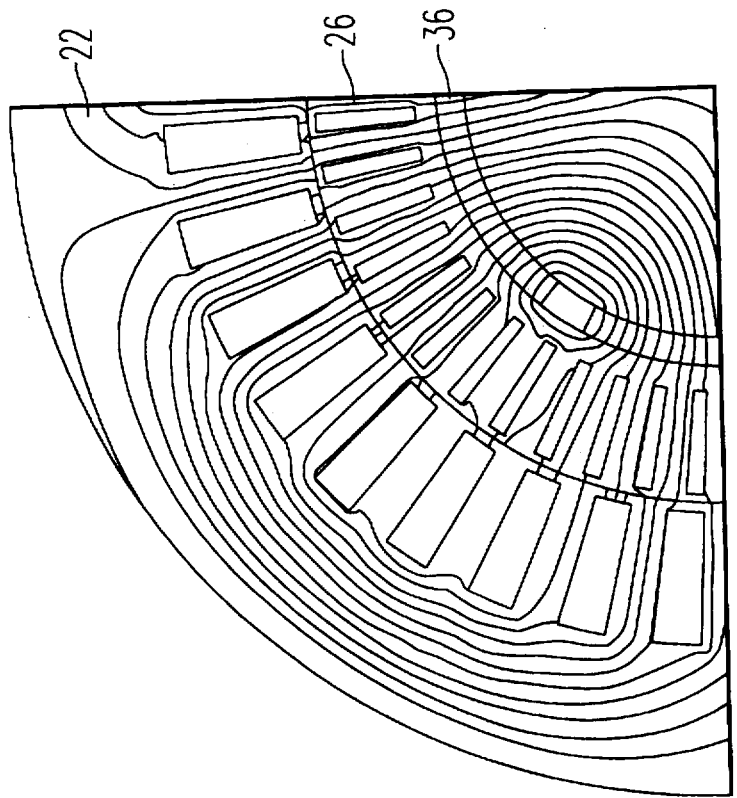
FIGS. 9A and 9B are illustrations showing the results of a magnetic field analysis on the squirrel-cage induction motor according to the first embodiment.
Figure 9A:
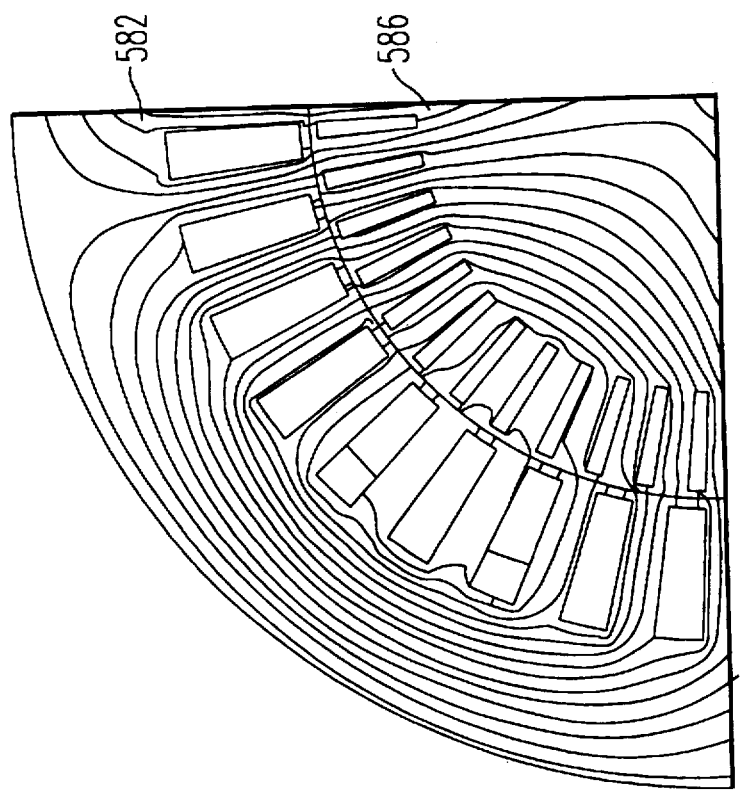

The results of a two-dimensional magnetic field analysis using a finite integral equation program will be described with reference to FIGS. 9A and 9B, wherein FIG. 9A shows the lines of magnetic force in a conventional squirrel-cage induction motor, and FIG. 9B shows the lines of magnetic force in the squirrel-cage induction motor 20 according to the present embodiment. As can been seen from FIG. 9A, in the conventional squirrel-cage induction motor, the lines of magnetic force deflect and do not extend in the radial direction of the rotor. In contrast, in the squirrel-cage induction motor 20 of the present embodiment, the lines of magnetic force are directed in the radial direction of the rotor. The results of the magnetic field analysis prove the increase of the torque which has been described with reference to FIG. 7A and 7B.

Figure 10:
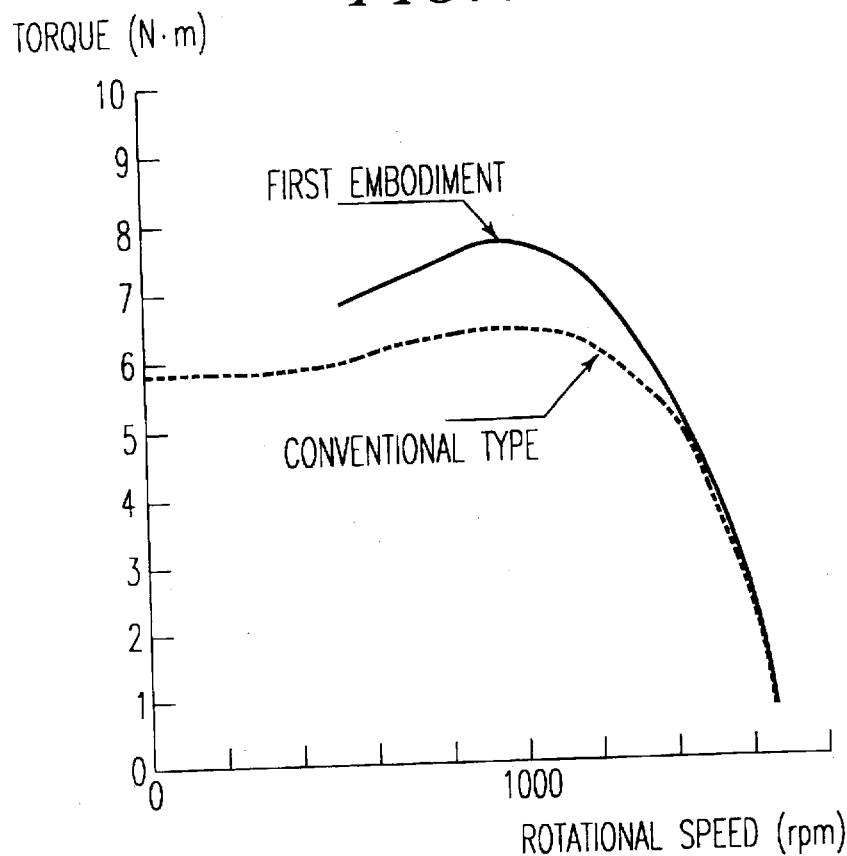
FIG. 10 is a graph showing the torque characteristic of the squirrel-cage induction motor according to the first embodiment.

The torque characteristic of the squirrel-cage induction motor 20 of the present embodiment will now be described with reference to FIG. 10. In this graph, a broken line indicates the torque generated by a conventional squirrel-cage induction motor while a continuous line indicates the torque generated by the squirrel-cage induction motor 20 according to the first embodiment. The abscissa represents the rotational speed (rpm) while the ordinate represents the torque (N·m). Each induction motor was initially operated to rotate at a speed (1800 rpm) at which the slip substantially becomes zero. The torque generated by each motor was measured while the load applied to the motor was gradually increased to increase the slip, thereby decreasing the rotational speed. In the conventional squirrel-cage induction motor, a maximum torque (stalling torque) of 6.4N·m was generated in the range of 900–1100 rpm. In contrast, in the squirrel-cage induction motor 20 of the present embodiment, a maximum torque (stalling torque) of 7.6 N·m was generated at 900–1100 rpm. This indicates that the maximum torque is increased by about 19%.

Figure 11:
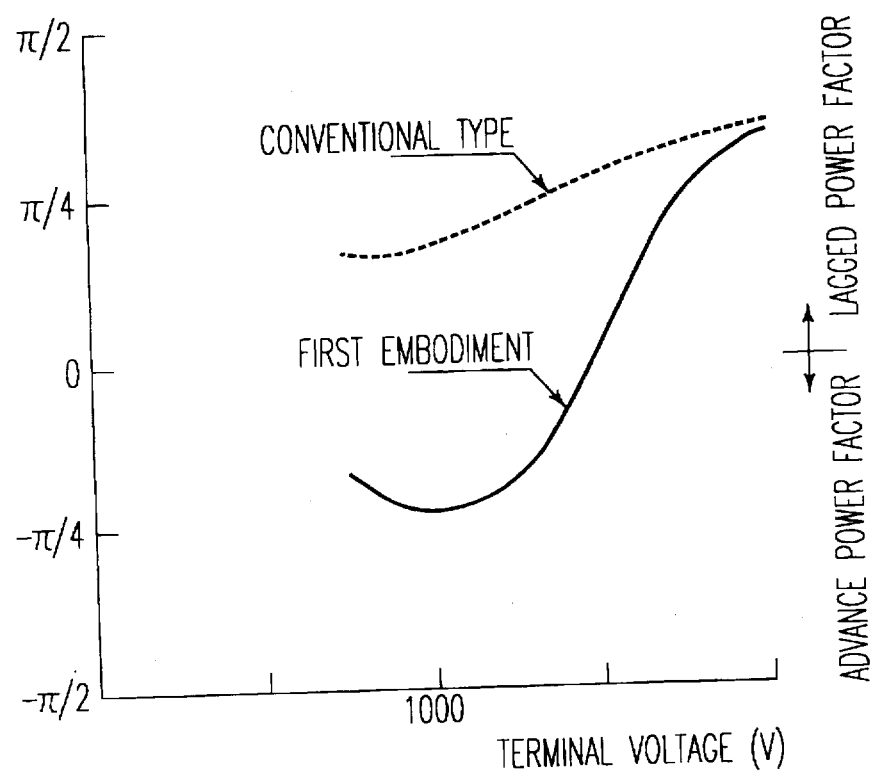
FIG. 11 is a graph showing the relationship between the terminal voltage and the power factor angle of the squirrel-cage induction motor according to the first embodiment.

Next, the power factor of the squirrel-cage induction motor 20 of the present embodiment will be described with reference to FIG. 11. FIG. 11 is a graph showing the relationship between the terminal voltage and the power factor angle which was measured in a state in which a torque detector or the like is attached, as a load, to the squirrel-cage induction motor 20. As is apparent from this graph, the induction motor 20 of the present embodiment can be operated in a state in which the power factor angle ($\phi$)=0, and cos $\phi$=1. Accordingly, the squirrel-cage induction motor 20 can be operated at a power factor of 100% by making the value of cos $\phi$ 1. In contrast, in the conventional motor, the power factor (cos $\phi$) varies in the range of 0.75 to 0.85.

Also, as is apparent from FIG. 11, the power factor angle of the conventional motor varies only in a range in which the power factor becomes a lagged power factor. In contrast, the power factor of the induction motor according to the present embodiment varies a widened range in which the power factor becomes a lagged power factor or an advanced power factor. Accordingly, the squirrel-cage induction motor of the present embodiment can be operated at an arbitrary power factor.

Based on the magnetic field analysis on the squirrel-cage induction motor 20 of the first embodiment (see FIGS. 9A and 9B), it is theoretically calculated that the torque is increased by 25%. The calculation was performed by integrating the square value of the magnetic flux density in the radial direction by using the angular position along the circumferential surface of the rotor as a variable. Also, as has been described with reference to FIG. 10, the result of the measurement proved that the torque is actually increased by 19%. That is, it was proved that a larger torque can be obtained by directing the magnetic flux in the radial direction by using the permanent magnets 36. Also, the squirrel-cage induction motor of the present embodiment has a simple structure in which the permanent magnets 36 which do not consume energy is rotated together with the rotating magnetic field of the stator. Accordingly, the loss of energy becomes mostly zero, and the efficiency of the induction motor can be increased as well as its torque.

In a conventional system for controlling an induction motor by vector control or the like, the control system is formed based upon the assumption that the magnetic flux density and the direction of the magnetic flux are constant. Accordingly, cases sometimes occur in which the induction motor cannot be accurately controlled due to variations in the magnetic flux of the rotor or the like. In contrast, in the induction motor according to the first embodiment, the magnetic flux density and the direction of the magnetic flux are always constant. This makes it possible to easily and correctly carry out an analysis for the vector control. Therefore, it becomes possible to control the induction motor in a more accurate manner.

In the squirrel-cage induction motor 20 of the present embodiment, the inner rotor 34 is made of iron. However, other materials such as nickel can be used in so far as the selected material allows the magnetic flux to sufficiently passes through the inner rotor 34. Also, in the inner rotor 34, a cylindrical space is formed between the shaft 32 and the inner rotor 34, the space may be eliminated by increasing the thickness of the inner rotor 34. Although the thickness of the inner rotor 34 can be decreased, the inner rotor 34 must have an enough thickness to allow the magnetic flux to passe therethrough. If the thickness of the inner rotor 34 is decreased excessively, it becomes difficult for the magnetic flux to pass through the inner rotor 34.

Methods and mechanisms for adjusting the power factor of the induction motor will be described in detail.

Figures 14, 15:
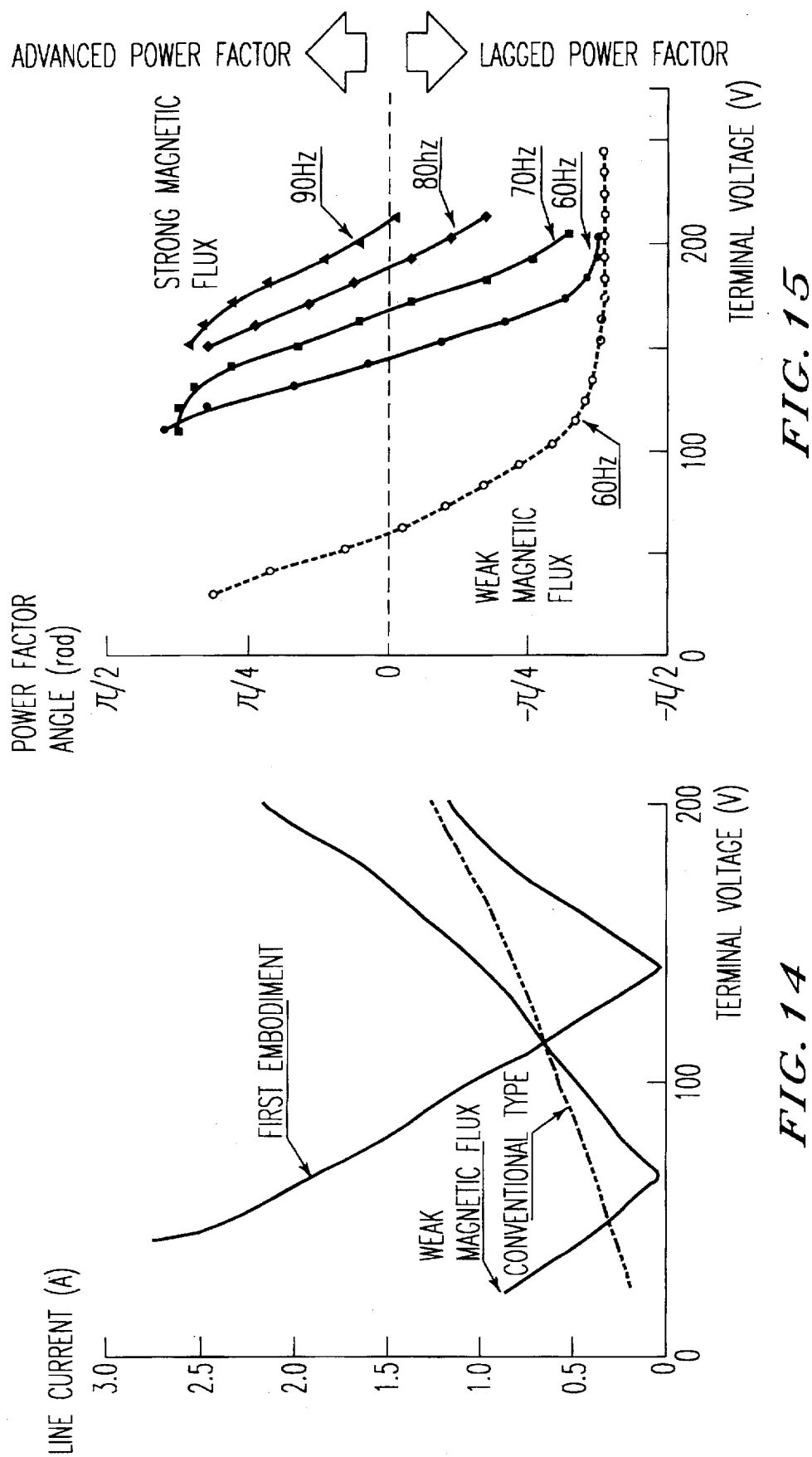
FIG. 14 is a graph showing the relationship between the terminal voltage and the line current of a squirrel-cage induction motor.
FIG. 15 is a graph showing the relationship between the terminal voltage and the power factor angle of the squirrel-cage induction motor, for explanation of adjustment of the power factor.

First, the relationship between the terminal voltage and the line current of the induction motor under no load will be described with reference to FIG. 14. In FIG. 14, a thin continuous line shows the characteristic of the induction motor according to the present embodiment, a thick continuous line shows the characteristic of an induction motor which has the same structure as that of the present embodiment but in which the magnet force of the permanent magnets is weakened, and a broken line shows the characteristic of a conventional induction motor. As shown in FIG. 14, in the conventional induction motor, the line current increases in proportion to the terminal voltage. In contrast, in the induction motor according to the present embodiment, the line current becomes minimum at about 140V when the terminal voltage is decreased from 200V, and the line current increases as the terminal voltage is further decreased from 140V. It is considered that this phenomenon occurs due to the following reasons. In the conventional induction motor, the input current is the sum of the excitation current and the load current, and both the excitation current and the load current vary in proportion to the terminal voltage. Accordingly, the input current varies in proportion to the terminal voltage. In contrast, in the induction motor with permanent magnets according to the present embodiment, the magnetic field is formed by the excitation current supplied to the windings of the stator and the permanent magnets when the terminal voltage is 200V. When the terminal voltage is decreased so that it becomes around 140V, the magnetic field is formed only by the permanent magnets. As a result, the excitation current becomes zero, and therefore, the input current becomes minimum. When the terminal voltage becomes lower than 140V, the excitation becomes excessive, and a demagnetization effect occurs. As a result, the line current gradually increases as the terminal voltage is decreased from 140V.

Similarly, in the induction motor in which the magnetic force of the permanent magnets is weakened, the line current becomes minimum when the terminal voltage becomes around 60V, as shown by the thick continuous line in FIG. 14, and the line current increases when the terminal voltage is increased from 60V or decreased from 60V.

As have been described in relation to FIG. 11, in the induction motor 20 with magnets according to the present embodiment, when the terminal voltage becomes 140V, the power factor angle becomes 0° (the power factor=100%) because the current (reactive current) becomes minimum. When the terminal voltage is decreased from 140V, the power factor angle becomes negative for an advanced power factor and the magnitude increases. On the other hand, when the terminal voltage is increased from 140V, the power factor angle becomes positive for a lagged power factor and the magnitude increases.

Whereas the power factor angle of the conventional induction motor varies only in a range in which the power factor becomes the lagged power factor, the power factor angle of the induction motor according to the first embodiment varies in a widened range in which the power factor becomes a lagged power factor or an advanced power factor. In addition, the squirrel-cage induction motor can be operated at an arbitrary power factor by adjusting the terminal voltage. Accordingly, in the squirrel-cage induction motor, the power factor angle (φ) can be made 0, i.e., the value of cos φ can be made 1, by adjusting the terminal voltage to 140V. With this adjustment, the squirrel-cage induction motor can be operated at a power factor of 100%. In contrast, in the conventional motor, the power factor (cos φ) varies in the range of 0.75 to 0.85.

Next, various method for making the power factor 100% at an arbitrary voltage will now be described.

First Method (adjustment of magnets):

In the squirrel-cage induction motor according to the first embodiment, the power factor becomes 100% when the terminal voltage becomes 140V. In the present method, the magnetic force of the permanent magnets is adjusted such that the induction motor operates at 100% power factor when a rated voltage (200V) is supplied thereto. As shown in FIG. 14, in the squirrel-cage induction motor according to the present embodiment, the line current becomes minimum (the power factor becomes 100%) when the terminal voltage becomes 140V. In the squirrel-cage induction motor in which the magnetic force of the magnets is weakened, the line current becomes minimum (the power factor becomes 100%) when the terminal voltage becomes 60V. Accordingly, when magnets having a magnetic force 1.4 times larger than that of the magnets in the first embodiment is used, the power factor of the induction motor can be made 100% at the rated voltage, i.e., at 200V.

The reason why the power factor can be adjusted by changing the magnetic force of the magnets is that in the induction motor 20 according to the first embodiment, the permanent magnets 36 rotate synchronously with the rotating magnetic field of the stator 22. That is, the induction motor 20 has characteristics similar to those of a synchronous motor. Since the adjustment of the magnetic force of the permanent magnets 36 is equivalent to the adjustment of the magnetic flux in a synchronous motor by adjusting the armature current thereof, the power factor can be made 100% by adjusting the magnetic force of the permanent magnets 36.

Second Method (adjustment of the number of turns of the stator winding):

In the present method, the number of turns of the stator winding is adjusted. A counter-electromotive force E generated in a synchronous machine is expressed by the following expression:

$$E=4.44 \cdot f \cdot N \cdot \phi,$$

where f is a frequency (the frequency of the drive voltage), N is the number of turns of the stator winding, φ is the magnetic flux density of the armature (the magnetic flux density of the magnets in the induction motor of the first embodiment). Accordingly, in the induction motor of the first embodiment, the power factor can be made 100% at the rated voltage (200V) by increasing the number N of turns of the winding to 1.4 times, thereby increasing the counter-electromotive force to 1.4 times.

The reason why the power factor can be adjusted by changing the number of turns of stator winding is that in the induction motor 20, the permanent magnets 36 rotate synchronously with the rotating magnetic field of the stator 22. That is, the induction motor 22 has characteristics similar to those of a synchronous motor, as described above. That is, changing the number of turns of the stator winding to adjust the counter-electromotive force is equivalent to changing the voltage applied to the stator winding. Accordingly, the power factor can be made 100% by changing the number of turns of the stator winding.

Third Method (adjustment of the drive frequency):

In the third method, the drive frequency f is adjusted. A counter-electromotive force E generated in a synchronous machine is expressed by E=4.44·f·N·φ, as described above. Accordingly, the power factor can be made 100% at the rated voltage (200V) by increasing the frequency of the drive voltage applied to the induction motor of the first embodiment to 1.4 times, thereby increasing the counter-electromotive force to 1.4 times.

The reason why the power factor can be adjusted by changing the drive frequency is that the induction motor 20 has characteristics similar to those of a synchronous motor, as described above. That is, changing the drive frequency f to adjust the counter-electromotive force is equivalent to changing the voltage applied to the stator winding. Accordingly, the power factor can be made 100% by changing the drive frequency.

This method in which the power factor is adjusted by changing the drive frequency will be described in further detail with reference to FIGS. 15 and 16. In FIG. 15, the abscissa represents the terminal voltage while the ordinate represents the power factor angle. In FIG. 15, a broken line represents the power factor angle of an induction motor whose magnets produce a weak magnetic flux and which is operated at 60 Hz. Solid lines respectively represent the states in which an induction motor whose magnets produce a strong magnetic flux is operated at 60 Hz, 70 Hz, 80 Hz and 90 Hz, respectively. As is apparent from FIG. 15, the power factor can be increased by increasing the frequency even when the terminal voltage is constant.

Figure 16:
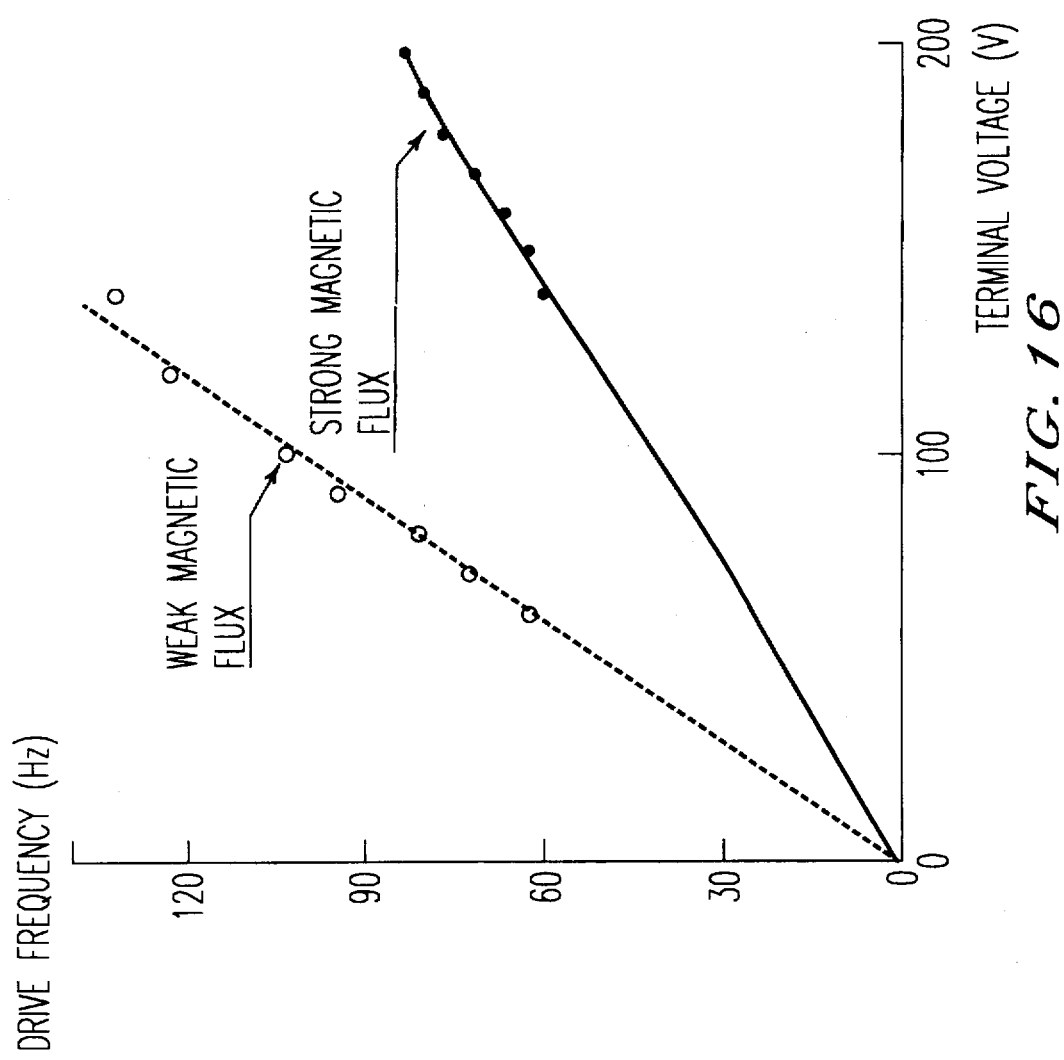
FIG. 16 is a graph showing the relationship between the terminal voltage and the drive frequency of the squirrel-cage induction motor at 100% power factor according to the third embodiment.

FIG. 16 shows the relationship between the terminal voltage and the drive frequency when the power factor is maintained at 100%. In FIG. 16, the abscissa represents the terminal voltage while the ordinate represents the drive frequency. This graph shows the states in which the induction motor whose magnets produce a weak magnetic flux and the induction motor whose magnets produce a strong magnetic flux are operated at different frequencies. As shown in FIG. 16, when the induction motor according to the first embodiment (which produce a strong magnetic flux) is driven at 87 Hz, the power factor becomes 100% at the terminal voltage of 200V.

Neither the first method in which the magnetic force of the magnets is adjusted, nor the second method in which the number of turns of the stator winding is adjusted can change the power factor of the induction motor when it is operated. In contrast, the third method in which the drive frequency is changed can change the power factor even when the induction motor is in operation.

Second Embodiment

Next, a second embodiment of the present invention will be described. In the first embodiment, the inner rotor 34 having the permanent magnets 36 is disposed inside the rotor 26 of the squirrel-cage induction motor. However, in the second embodiment, an inner rotor corresponding to the inner rotor 34 of the first embodiment is used in a solid rotor type induction motor. Since the mechanical structure of the solid rotor type induction motor according to the second embodiment is the same as that of the induction motor according to the first embodiment, the drawings and description thereof will be omitted. In the solid rotor type induction motor, a rotor is used which is a mass of iron core and which includes neither a cage nor a winding. The rotor, however, is provided with a cylindrical space for receiving the inner rotor 34. The solid rotor type induction motor generates no cogging torque, provides a large starting torque, and has a dropping characteristic.

Next, the results obtained by analyzing the magnetic flux density (T) in the radial direction which was generated in the solid rotor type induction motor of the present embodiment will be described with reference to the graph shown in FIG. 12. In this graph, a broken line indicates the magnetic flux density of a conventional solid rotor type induction motor while a continuous line indicates the magnetic flux density of the solid rotor type induction motor according to the present embodiment. The abscissa represents the electrical angle (rad) while the ordinate represents the magnetic flux density (T) in the radial direction. The conventional solid rotary type induction motor has a stator and windings which are the same as those of the solid rotor type induction motor according to the present embodiment. The solid rotor type induction motor of the present embodiment is different from the conventional the solid rotor type induction motor in that an inner rotor to which permanent magnets are fixed is disposed inside a rotor. As shown in the graph, the magnetic flux density changes like a rectangular wave with variation in the electrical angle, i.e., the magnetic flux density steeply increases and creases in the vicinity of an electrical angle of π/4 in the solid rotor type induction motor of the present embodiment, whereas the magnetic flux density changes like a sinusoidal wave with variation of the electrical angle in the conventional solid rotor type induction motor. As can been seen from this graph, in the solid rotor type induction motor of the present embodiment, the magnetic flux density (T) is increased over the entire electrical angle, compared to the conventional motor.

Figure 13B:
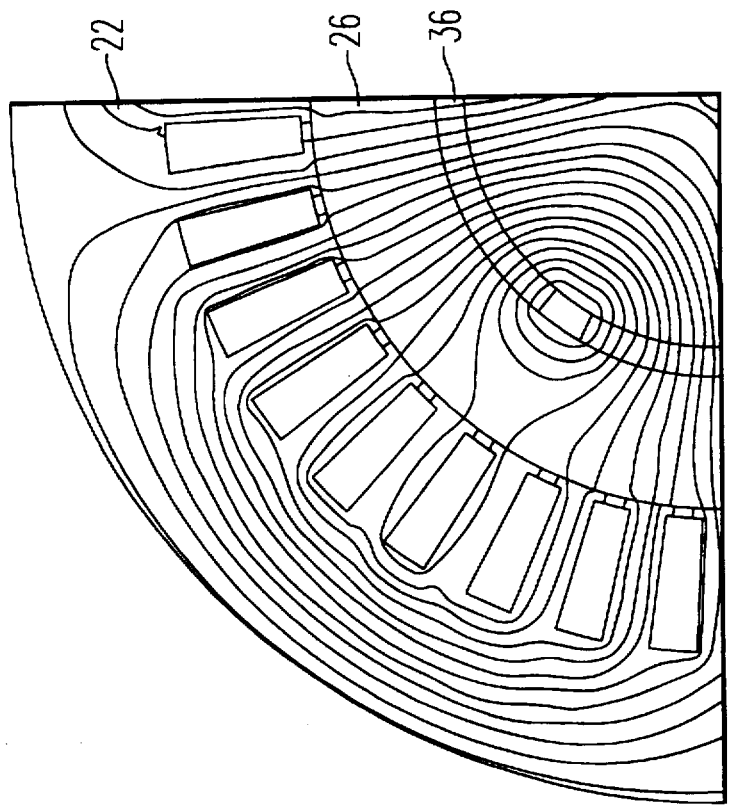
FIGS. 13A and 13B are illustrations showing the results of a magnetic field analysis on the solid rotor type induction motor according to the second embodiment.
Figure 13A:
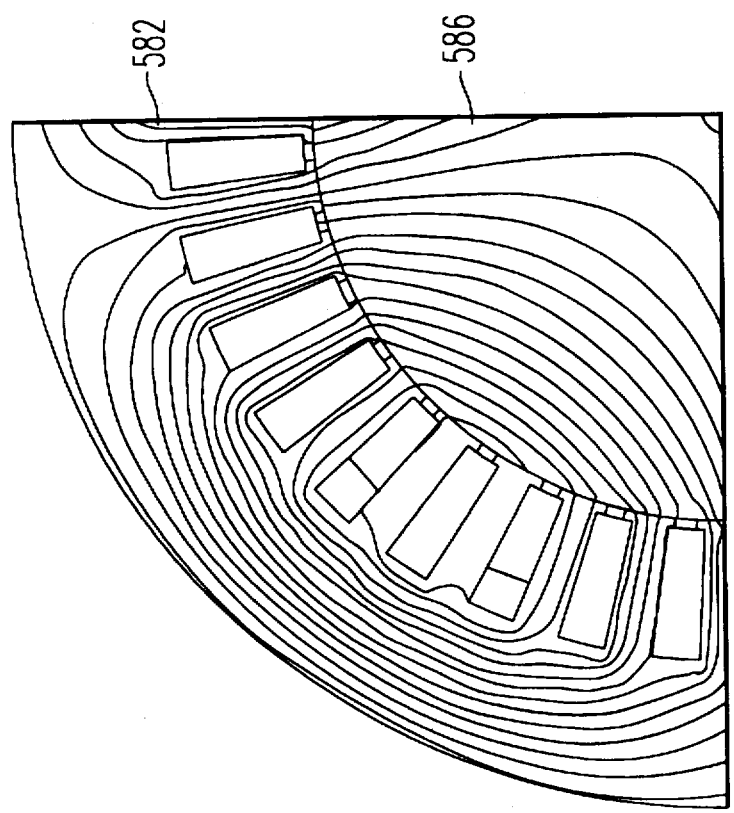

The results of a two-dimensional magnetic field analysis will be described with reference to FIGS. 13A and 13B, wherein FIG. 13A shows the lines of magnetic force in a conventional solid rotor type induction motor, and FIG. 13B shows the lines of magnetic force in the solid rotor type induction motor according to the present embodiment. As can been seen from FIG. 13A, in the conventional solid rotor type induction motor, the lines of magnetic force deflect and do not extend in the radial direction of the rotor. In contrast, in the solid rotor type induction motor of the present embodiment, the lines of magnetic force are directed in the radial direction of the rotor.

It was calculated based on the result of the magnetic field analysis shown in FIGS. 13A and 13B that the torque can be increased by 75%. Since the induction motor according to the first embodiment is a squirrel-cage induction motor in which the magnetic flux is regulated by the cage, the effect of the permanent magnets 36 is not relatively large. In contrast, in the solid rotor type induction motor, the magnetic flux easily deflects. Therefore, it is predicted that a large effect can be obtained in the solid rotor type induction motor. Although the measurement using an actual solid rotor type induction motor has not been completed, it is presumed that a considerably high torque can be generated. Also, the solid rotor type induction motor of the present embodiment has a simple structure in which the permanent magnets 36 which do not consume energy is rotated together with the rotating magnetic field of the stator. Accordingly, the loss of energy becomes mostly zero, and the efficiency of the induction motor can be increased as well as its torque.

In a conventional system for controlling an induction motor by vector control or the like, the control system is formed based upon the assumption that the magnetic flux density and the direction of the magnetic flux are constant. Accordingly, cases sometimes occur in which the induction motor cannot be accurately controlled due to variations in the magnetic flux of the rotor or the like. In contrast, in the induction motor according to the second embodiment, the magnetic flux density and the direction of the magnetic flux are always constant. This makes it possible to easily and correctly carry out an analysis for the vector control. Therefore, it becomes possible to control the induction motor in a more accurate manner.

Third Embodiment

Figure 17A:
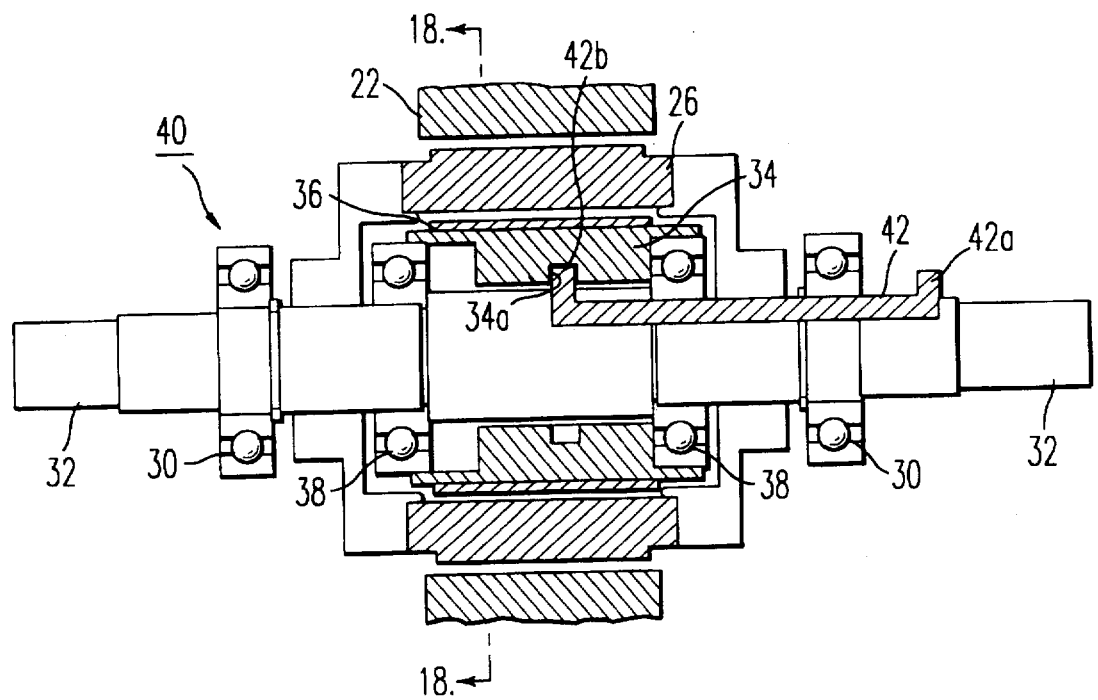
FIGS. 17A and 17B are sectional views showing an induction motor according to a third embodiment of the present invention.
Figure 17B:
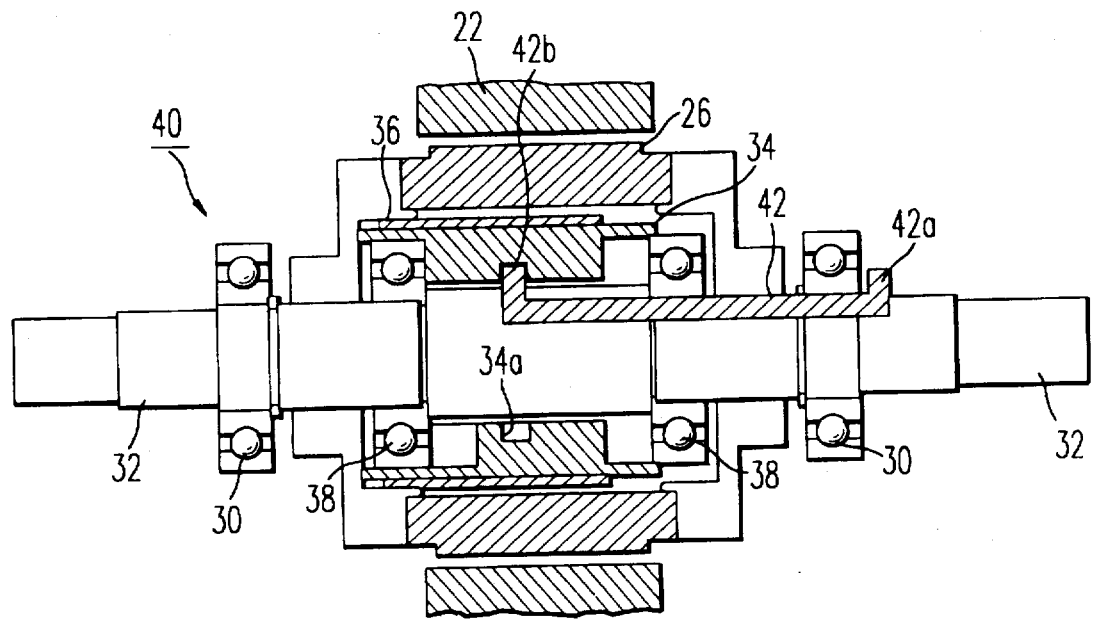
Figure 18:
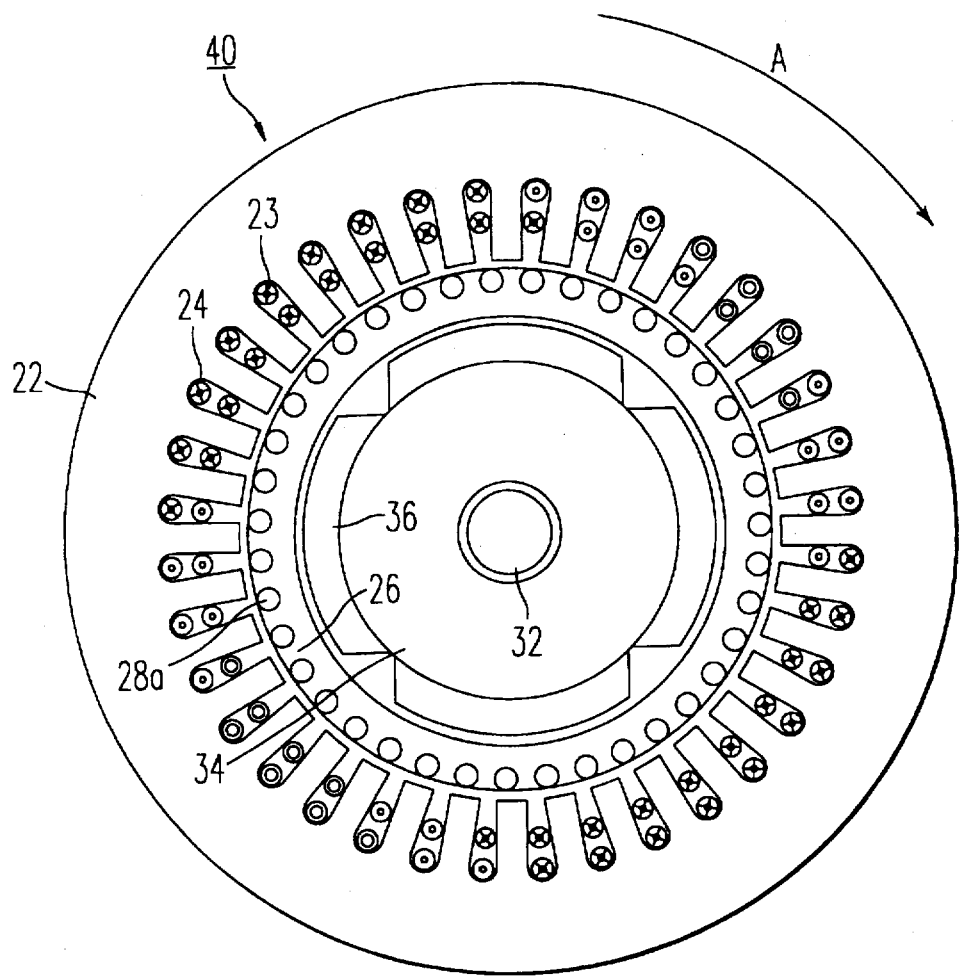
FIG. 18 is a sectional view taken along line J—J in FIG. 17A.

A squirrel-cage induction motor according to a third embodiment of the present invention will now be described with reference to FIG. 17A through FIG. 20. The same members as those of the first embodiment are represented by the same reference numerals, and the detail description thereof will be omitted. As shown in FIGS. 17A, 17B and 18, a plurality of slots 24 are formed in the inner circumference of a stator 22, and windings 23 are disposed in the slots 24. A rotor 26 is fixed to a shaft 32 which is rotatably supported via a pair of bearings 30. A plurality of secondary conductors 28a are embedded in the rotor 26. Also, a cylindrical inner rotor 34 made of steel is disposed inside the rotor 26. The inner rotor 34 is supported by the shaft 32 via a pair of bearings 38 for relative rotation with respect to the shaft 32. Four permanent magnets 36, the number of which corresponds to the number of the poles of a squirrel-cage induction motor 40, are attached to the outer circumference of the inner rotor 34.

Figure 19:
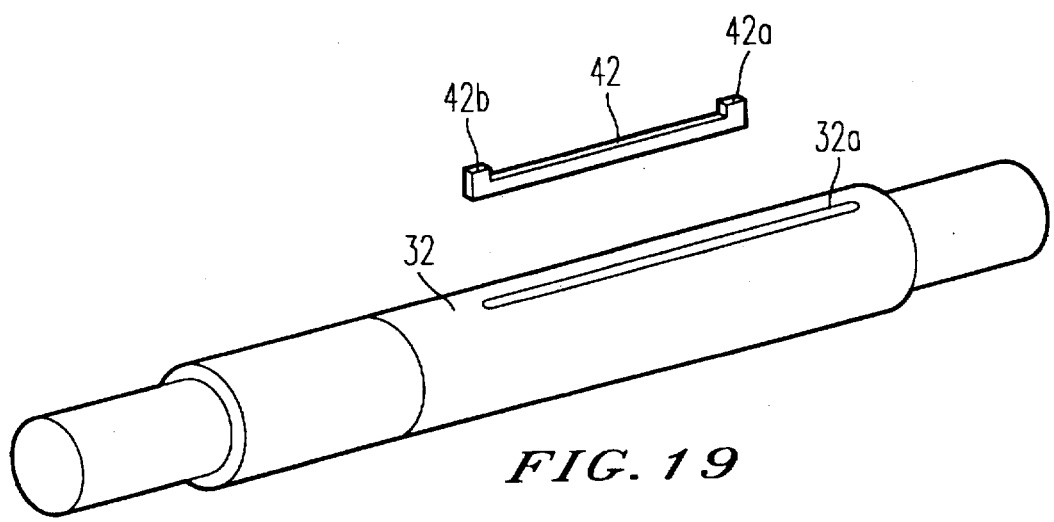
FIG. 19 is a perspective view of a shaft of the induction motor shown in FIGS. 17A and 17B.

FIG. 19 is a perspective view of the shaft 32 shown in FIGS. 17A and 17B. A key groove 32a is formed in the shaft 32, and a key (spacer) 42 is placed in the groove 32a for slide movement in the axial direction of the shaft 32. As shown in FIGS. 17A and 17B, one bent portion 42b of the key 42 is fitted into a groove 34a formed in the inner rotor 34 while the other bent portion 42a of he key 42 projects from the shaft 32 at an axial position outside a housing (not shown). Accordingly, when the bent portion 42a is operated from the outside, the inner rotor 34 is axially moved along the shaft 32. This structure makes it possible to adjust the amount of magnetic flux which is generated by the permanent magnets 36 attached to the inner rotor 34 and penetrates the rotor 26 and the stator 22.

Figure 20:
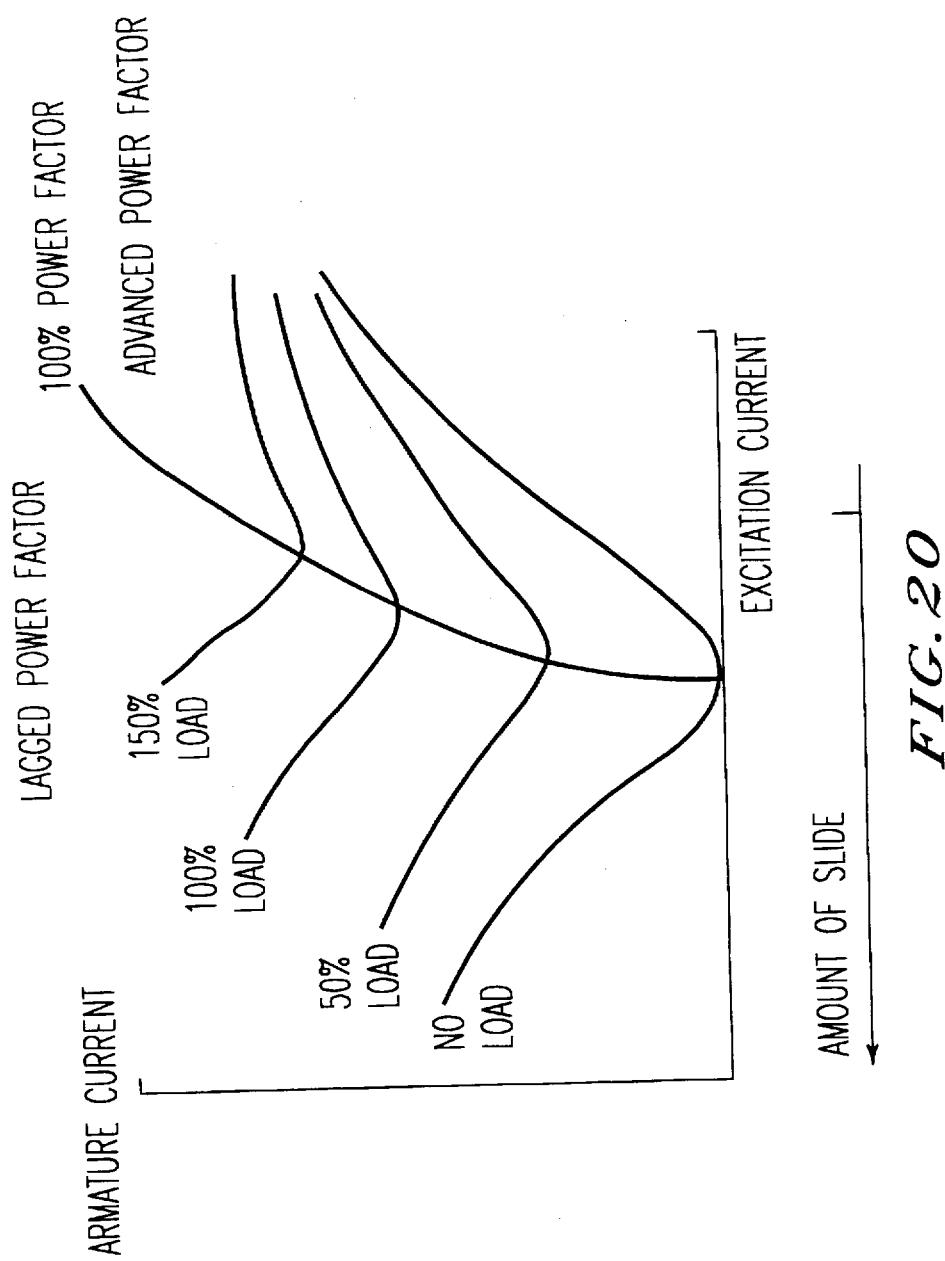
FIG. 20 is a graph showing the relationship between the amount of slide and the power factor in the induction motor according to the third embodiment.

FIG. 20 shows the V curves of a synchronous machine. The power factor of the synchronous machine can be maintained at 100% during operation by adjusting the excitation current or the armature current in accordance with variations in the load. In the induction motor 40 of the present embodiment, the power factor can be adjusted by sliding the permanent magnets 36 (inner rotor 34). This adjustment is equivalent to adjusting the armature current or excitation current of the synchronous machine. During the operation, the power factor of the induction motor 40 is monitored, and the bent portion 42a of the key 42 is moved in the axial direction by an unillustrated electromagnet to adjust the amount of the magnetic flux which is supplied from the permanent magnets 36 and passes through the rotor 26 and the stator 22, thereby maintaining the power factor at 100%.

In the third method of the first embodiment in which the drive frequency is adjusted, the power factor of the induction motor can be adjusted even when the induction motor is in operation. However, since an additional circuit such as an invention must be used to change the frequency of the power source, the costs become higher. In contrast, in the induction motor 40 according to the present embodiment, the power factor can be adjusted during the operation by using a simple adjusting mechanism. Accordingly, an induction motor capable of adjusting the power factor during operation can be manufactured at reduced costs. Also, in cases where the induction motor of the present embodiment is used together with a conventional induction motor in a machine or equipment, the overall power factor of the machine or equipment can be improved by operating the induction motor according to the present embodiment at an advanced power factor.

Fourth Embodiment

Figure 21:
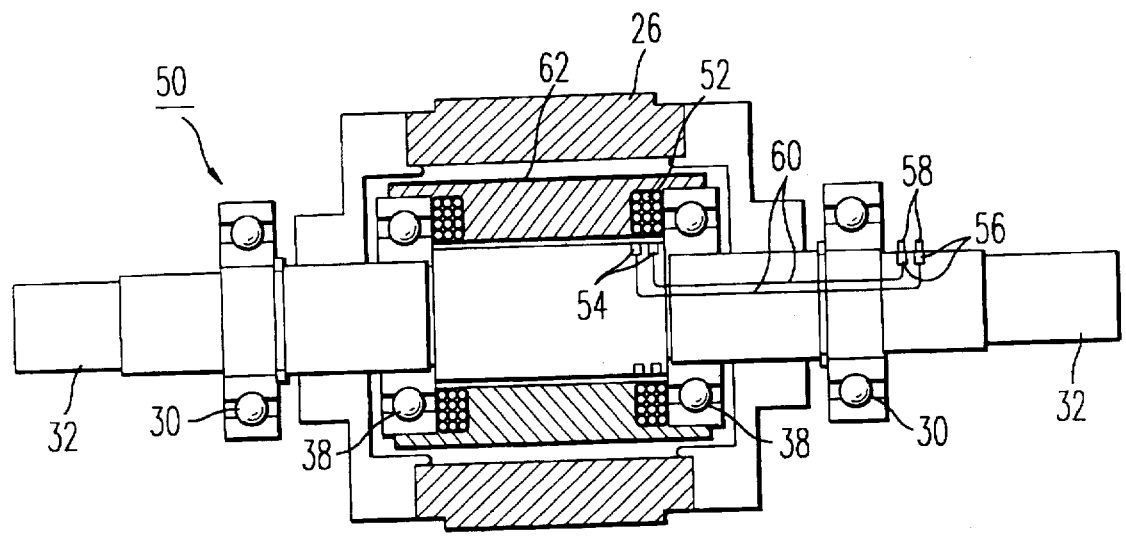
FIG. 21 is a longitudinal sectional view of an induction motor according to a fourth embodiment of the present invention.
Figure 22:
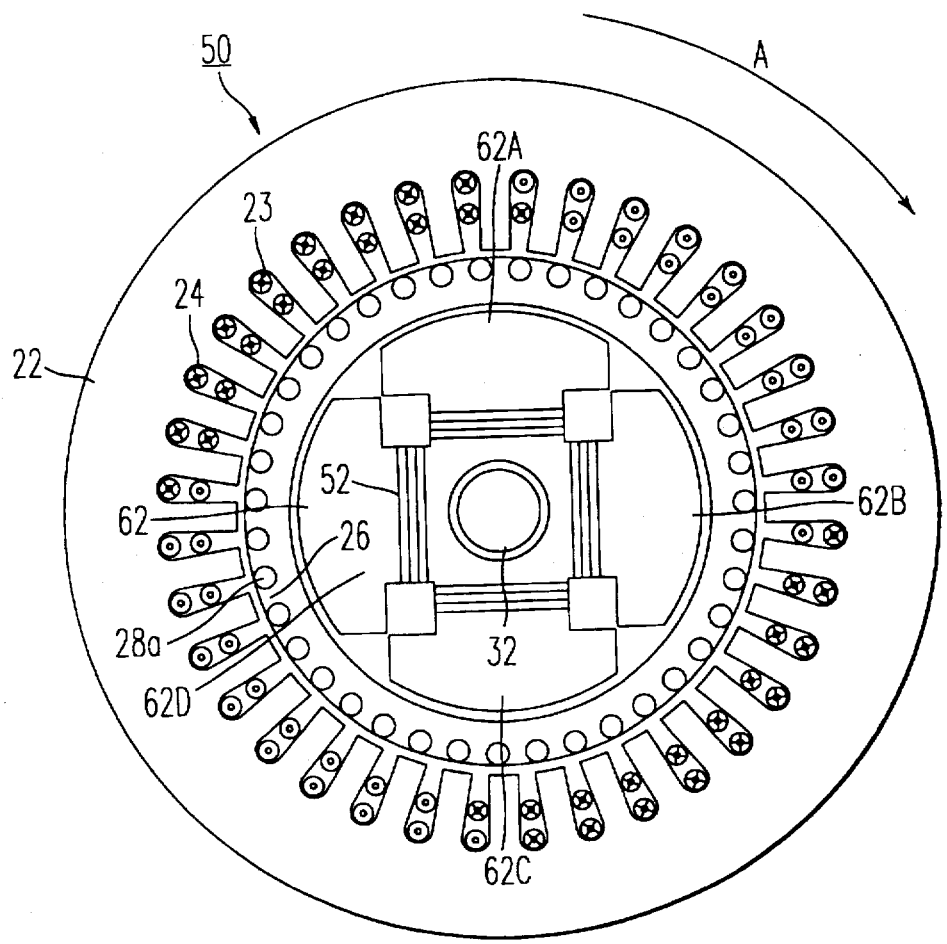
FIG. 22 is a transverse sectional view of the induction motor shown in FIG. 21.

A squirrel-cage induction motor according to a fourth embodiment of the present invention will now be described with reference to FIG. 21 through FIG. 24. The same members as those of the first embodiment are represented by the same reference numerals, and the detail description thereof will be omitted. As shown in FIGS. 21 and 22, a plurality of slots 24 are formed in the inner circumference of a stator 22, and windings 23 are disposed in the slots 24. A rotor 26 is fixed to a shaft 32 which is rotatably supported via a pair of bearings 30. A plurality of secondary conductors 28a are embedded in the rotor 26. Also, an electromagnet 62 is disposed inside the rotor 26, and is supported by the shaft 32 via a pair of bearings 38 for relative rotation with respect to the shaft 32. Four magnetizing portions 62A, 62B, 62C and 62D, the number of which corresponds to the number of the poles of a squirrel-cage induction motor 50, are formed on the outer circumference of the electromagnet 62.

A coil 52 is arranged around each of the base portions of the magnetizing portions 62A–62D. The shaft 32 is provided with slip rings 54 and 56, and connection lines 60 connecting these slip rings 54 and 56. Brushes 58 are contacted with the slip rings 56 to supply electricity thereto from the outside. Also, unillustrated brushes which are connected to the coils 52 are contacted with the slip rings 54. With this structure, a DC current supplied to the brushes 58 is led to the coils 52 so that the magnetizing portions 62A–62D of the electromagnet 62 are excited, respectively.

Next, the operation of the induction motor 50 according to the present embodiment will be described. When three-phase alternating currents are supplied to the windings 23 of the stator 22, a magnetic field which rotates in a direction indicated by arrow A is generated. The magnetic flux of the rotating magnetic field passes across the secondary conductors 28a so that a speed electromotive force is generated in each secondary conductor 28a. As a result, a current flows due to the speed electromotive force, and a torque is generated due to the mutual action between the current and the magnetic flux so that the rotor 26 is rotated in the same direction as the direction of rotation of the magnetic field. Since a slip is produced depending on the generated torque, the rotational speed of the rotor 26 becomes slower than that of the rotating magnetic field. Also, electricity supplied to the brushes 58 is fed to the coils 52 so as to excite the magnetizing portions 62A–62D of the electromagnet 62. Since these magnetizing portions 62A–62D are attracted by the magnetic force generated in the stator 22, so that the electromagnet 62 rotates synchronously with the rotating magnetic field generated in the stator 22. To be exact, the electromagnet 62 rotates with a slight angular delay. In the squirrel-cage induction motor 50, the magnetic flux is directed toward the magnetizing portions 62A–62D which are opposed to the stator 22. So, the magnetic flux crosses the secondary conductors 28a of the rotor 26 in the radial direction, whereby the torque generated in the rotor 26 increases.

Figure 23:
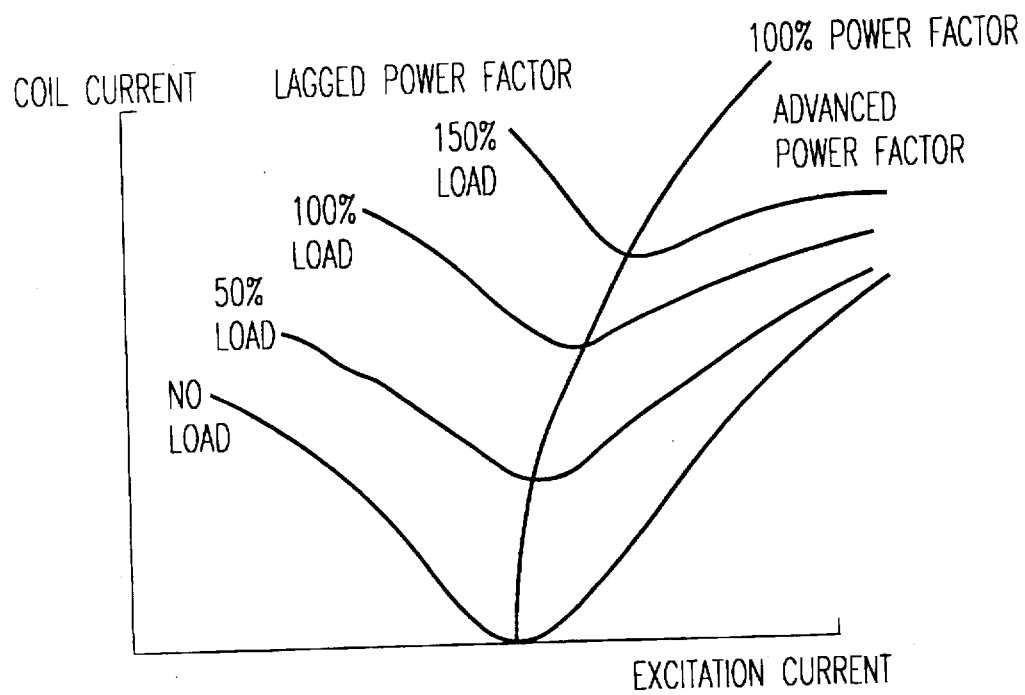
FIG. 23 is a graph showing the relationship between the excitation current and the coil current of the induction motor according to the fourth embodiment.

FIG. 23 shows the relationship between the excitation current and the coil current of the induction motor according to the present embodiment. Like in a synchronous machine whose power factor can be maintained at 100% by adjusting the armature current thereof, the power factor can be maintained by adjusting the current supplied to the coils 52 in the present embodiment.

Like in the third embodiment, an induction motor capable of adjusting the power factor during operation can be manufactured at reduced costs. Also, in cases where the induction motor of the present embodiment is used together with a conventional induction motor in a machine or equipment, the overall power factor of the machine or equipment can be improved by operating the induction motor according to the present embodiment at an advanced power factor.

Figure 24:
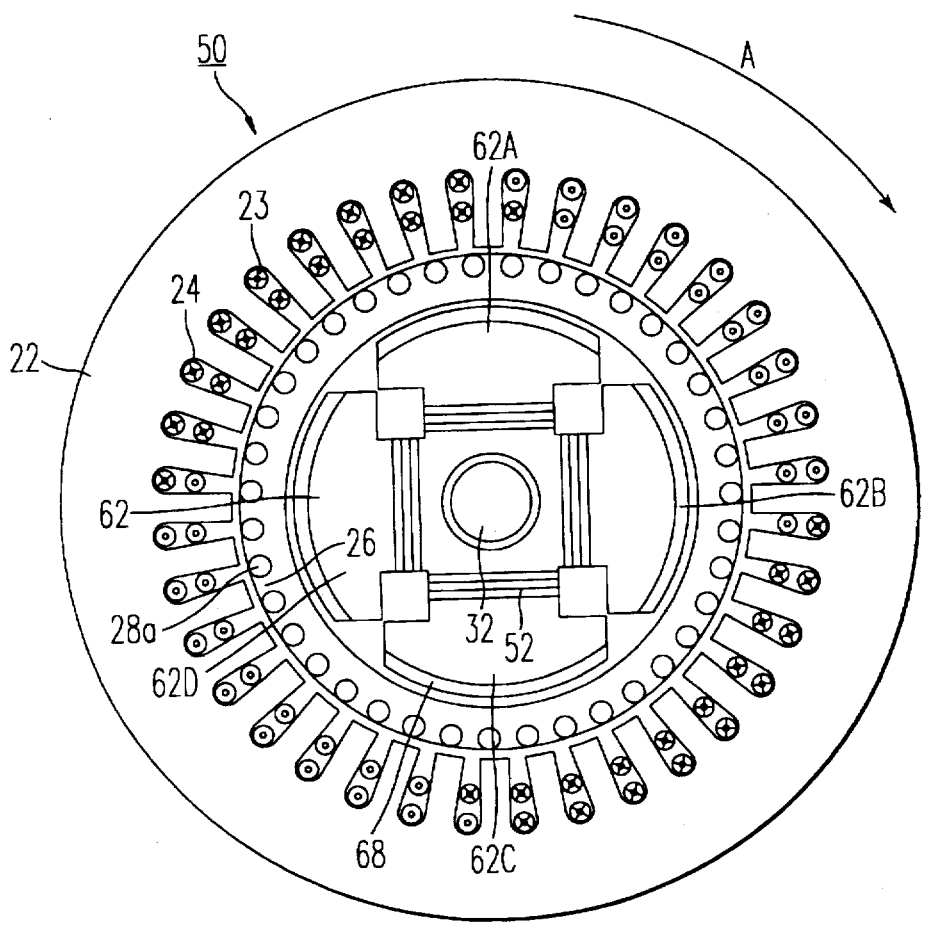
FIG. 24 is a transverse sectional view showing a modification of the induction motor shown in FIGS. 21 and 22.

FIG. 24 shows a modification of the induction motor according to the fourth embodiment. In this modification, permanent magnets 68 are attached to the outer surfaces of the magnetizing portions 62A–62D of the electromagnet 62. The magnetic force of the permanent magnet 68 is adjusted such that the power factor becomes 100% during a rated operation. In such a rated operation, the power factor is maintained at 100% without supplying the coils 52 with current. When the load of the induction motor increases, a current is supplied to the coils 52 to generate a magnetic flux from the magnetizing portions 62A–62D in addition to the magnetic flux from the permanent magnets 68. With this operation, the overall magnetic flux is increased to maintain the power factor at 100%. On the contrary, when the load decreases, a current is supplied to the coils 52 in the reverse direction so as to decrease the overall magnetic flux, thereby maintaining the power factor at 100%. The induction motor according to this modification has the advantage that the power factor can be maintained at 100% by using a small amount of current regardless of the load.

Fifth Embodiment

Figure 25A:
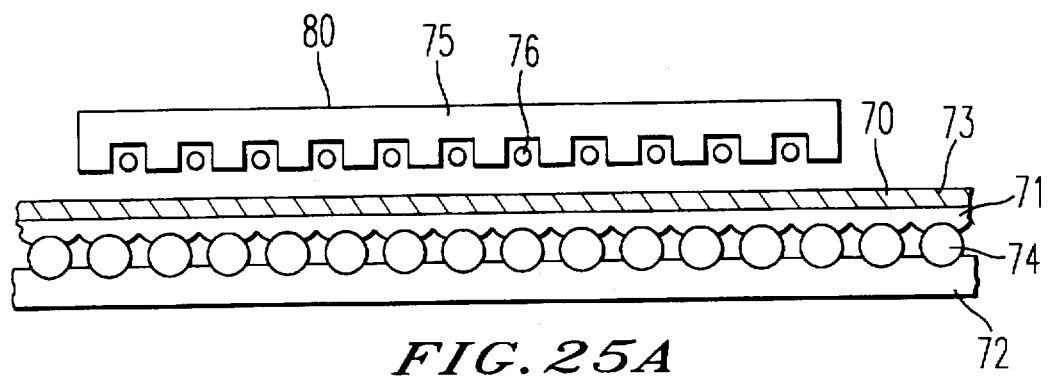
FIGS. 25A and 25B are a longitudinal sectional view and a perspective view of a linear induction motor according to a fifth embodiment of the present invention.

A linear induction motor according to a fifth embodiment of the present will be described with reference to FIGS. 25A and 25B. FIG. 25A is a sectional view of the linear induction motor of the present embodiment, and FIG. 25B is a perspective view of a secondary coil assembly before assembly.

As shown in FIG. 25A, the linear induction motor is composed of a primary coil assembly 80 and a secondary coil assembly 70. The second coil assembly 70 is stationary, and the primary coil assembly 80 is linearly movable relative to the secondary coil assembly 70. The primary coil assembly 80 is composed of a primary core 75 and a winding 76. The secondary coil assembly 70 is composed of an first secondary core 71, a second secondary core 72, a secondary conductor 73 made of aluminum or copper and disposed on the upper surface of the first secondary core 71, and a plurality of cylindrical magnets 74 rotatably supported between the first secondary core 71 and the second secondary core 72.

Figure 25B:
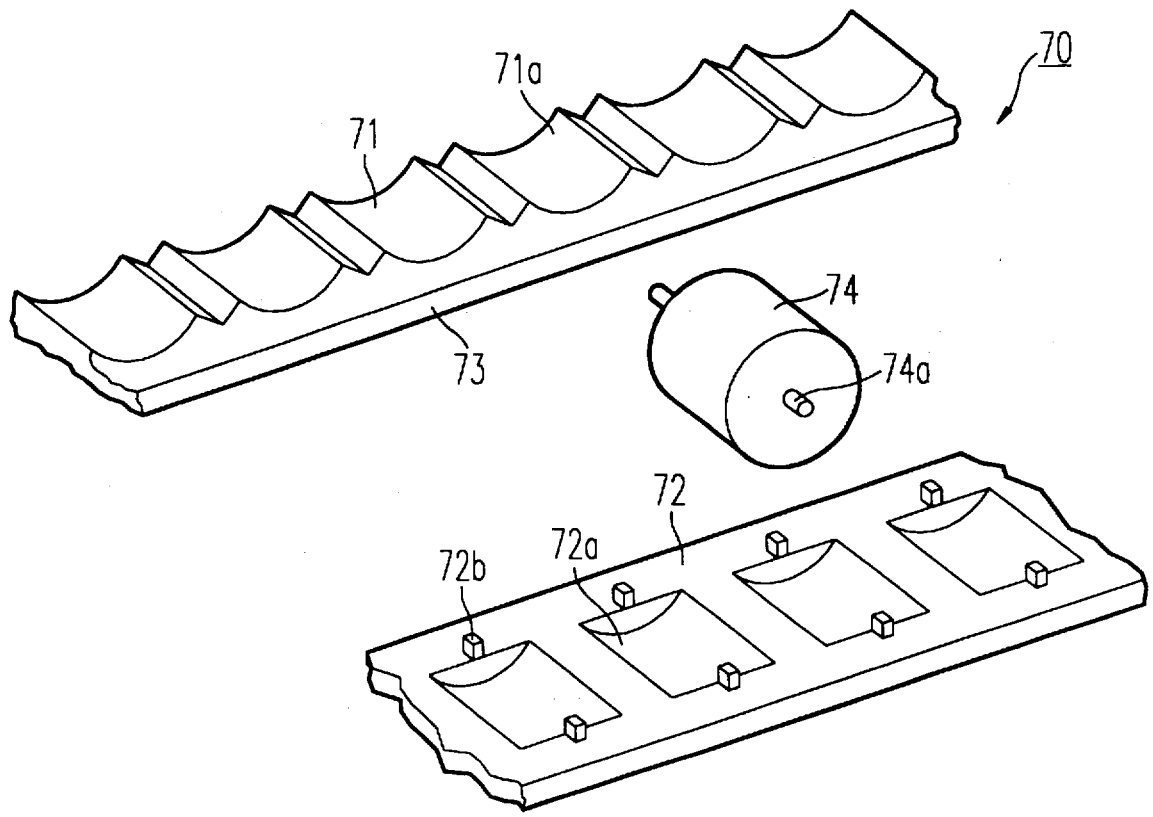

As shown in FIG. 25B, a shaft 74a penetrates the rotational center of each cylindrical magnet 74. A plurality of depressions 72a are formed in the upper surface of the second secondary core 72 to prevent the interference with the cylindrical surfaces of the magnets 74. Also, a pair of bearing portions 72b are projected upwardly so as to rotatably support the shaft 74a of each magnet 74 at both sides thereof. Moreover, a plurality of depressions 71a are formed in the first secondary core 71 to slidably support the magnets 74. Each magnet 74 is placed in one of the depressions 72a of the second secondary core 72 such that the shaft 74a is supported by the bearing portions 72b, and the first secondary core 71 shown in FIG. 25B is turned over such that the depressions 71a face downward, and is placed on the second secondary core 72 to cover the magnets 74, thereby completing the assembly of the second coil assembly 70.

Figure 26A:
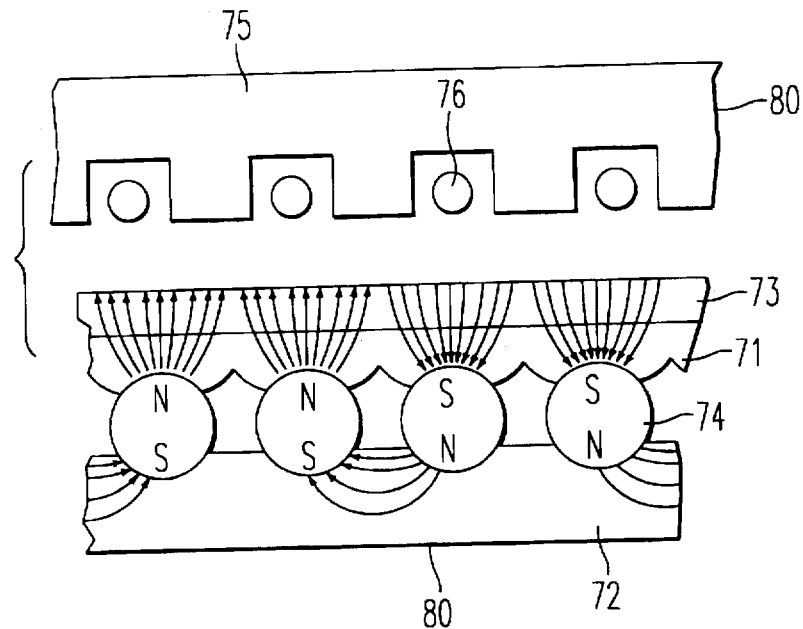
FIG. 26A is an explanatory illustration showing the operation of the linear induction motor according to the fifth embodiment.

Next, the operation of the linear induction motor according to the present embodiment will be described with reference to FIGS. 25A and 26A. When a current is supplied to the winding 76 of the primary coil assembly 80, a magnetic flux is generated in the primary core 75. The magnetic flux from the primary core 75 intersects the secondary conductor 73. As a result, an induction current flows within the secondary conductor 73 in the direction perpendicular to the sheet of FIG. 26A, so that a thrust force is generated due to the mutual action between the induction current and the magnetic flux. At this time, the magnets 74 rotate in accordance with the direction of the magnetic flux from the primary coil assembly 80. Since the magnetic flux from the primary coil assembly 80 extends toward the magnets 74, the magnetic flux perpendicularly crosses the secondary coil assembly 70. As a result, the magnetic flux passes through the first secondary core 71 and reaches the bottom portion of the second secondary core 72.

Figure 26B:
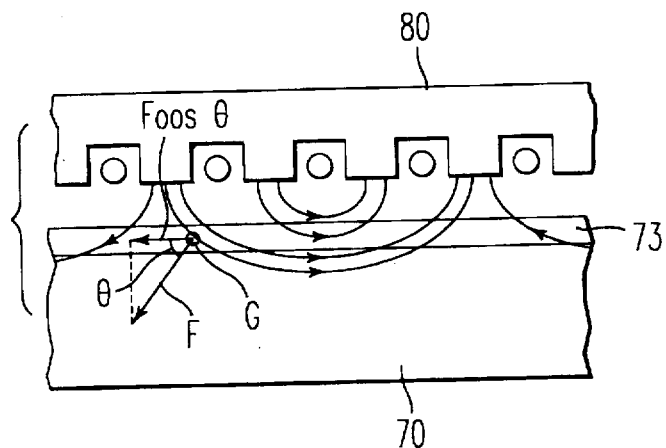
FIG. 26B is an explanatory illustration showing the operation of a conventional linear induction motor.

FIG. 26B shows the magnetic flux generated in a conventional liner induction motor. For example, at point G in the secondary conductor 73, an induction current flows in the direction perpendicular to the sheet of FIG. 26B, but the magnet flux does not cross the secondary conductor 73 at right angle. Accordingly, a torque F is generated heading obliquely downward, so that the trust force acting on the primary coil assembly 80 becomes F·cos θ. In contrast, in the linear induction motor according to the present embodiment, the magnetic flux perpendicularly heads for the magnets 74 so that the magnetic flux effectively intersects (i.e., substantially perpendicularly intersects) with the current flowing through the secondary conductor 73. Accordingly, the torque generated in the secondary coil assembly 70 increases. Also, it is considered that since the magnetic flux is strengthened by the magnets 74, the thrust force is further increased. Like in the first embodiment, the power factor can arbitrarily be adjusted by changing the magnetic force of the magnets, the number of turns of the winding, or the frequency of the drive voltage.

Figure 26C:
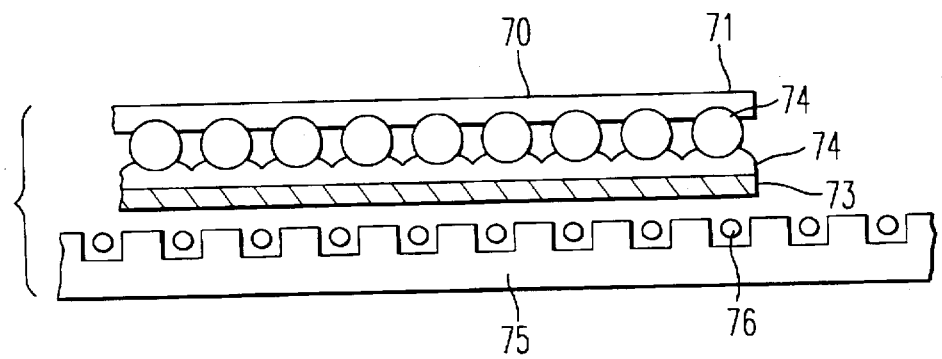
FIG. 26C is a longitudinal sectional view of a linear induction motor according to a first modification of the fifth embodiment.

FIG. 26C shows a first modification of the linear induction motor according to the present embodiment. In the linear induction motor according to this modification, the secondary coil assembly 70 is movable while the primary coil assembly 80 is stationary. As in the above-described linear induction motor, rotatable magnets 74 are disposed in the secondary coil assembly 70 which is movable.

Figure 27A:
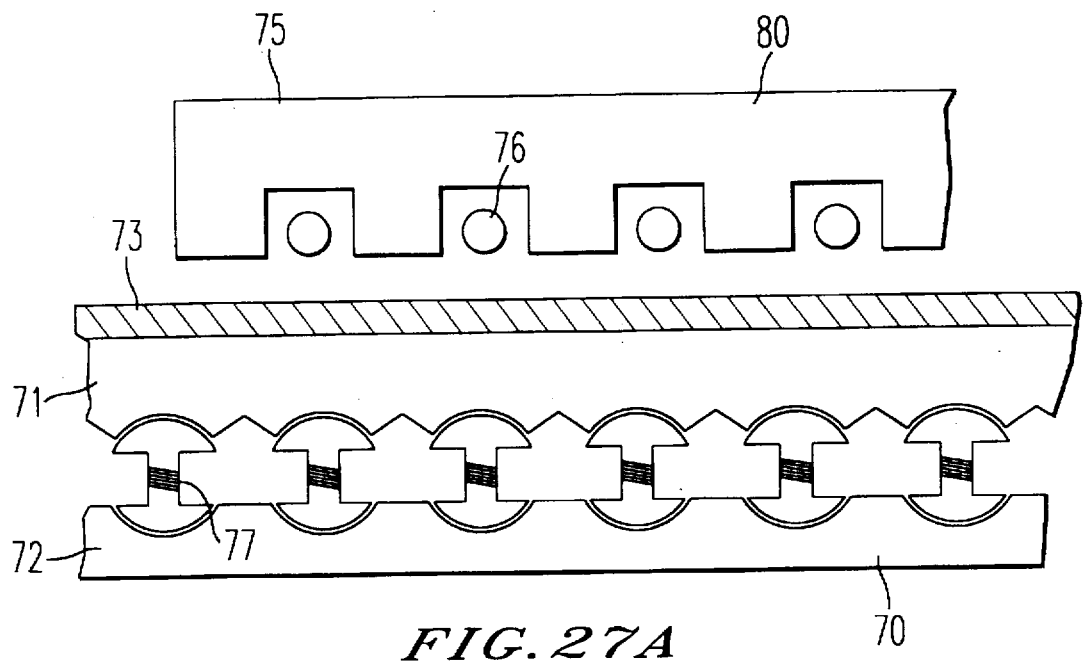
FIGS. 27A and 27B are longitudinal sectional views of linear induction motors according to second and third modifications of the fifth embodiment.

FIG. 27A shows a second modification of the linear induction motor according to the present embodiment. In this modification, the magnets are formed by electromagnets 77. The electromagnets 77 are supported by the second secondary core 72 through unillustrated bearings while being supplied with electrical power. When a current is supplied to the winding 76 of the primary coil assembly 80, the magnetic flux is generated in the primary core 75, so that the electromagnets 77 rotate in accordance with the direction of the generated magnetic flux. As a result, the magnetic flux from the primary coil assembly 80 perpendicularly extends toward the secondary coil assembly 70. In this modification, it is considered that, similarly to the fourth embodiment described with reference to FIG. 21 through FIG. 23, the power factor can be adjusted by adjusting the excitation current supplied to the electromagnets 77.

Figure 27B:
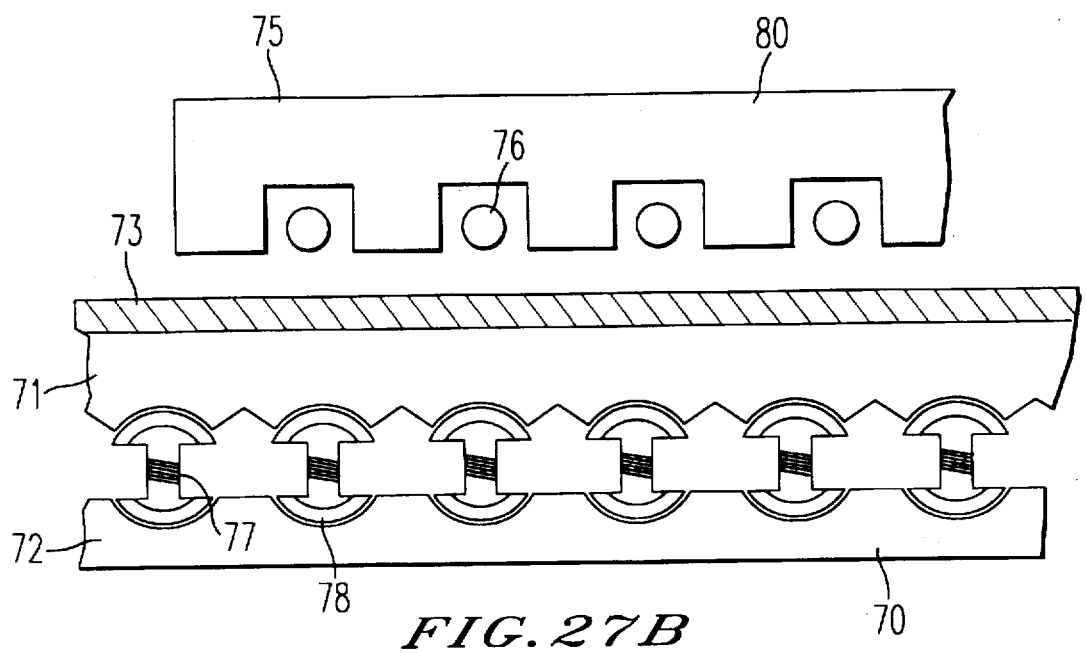

FIG. 27B shows a third modification of the linear induction motor according to the present embodiment. In this modification, the magnets are composed of electromagnets 77 and permanent magnets 78. The magnets composed of the electromagnets 77 and the permanent magnets 78 also supported such that the magnets rotate in accordance with the direction of the generated magnetic flux of the primary core 75. Similarly to the fourth embodiment described with reference to FIG. 24, the magnetic force of the permanent magnets 78 is adjusted such that the power factor becomes 100% during a rated operation. When the load increases, a current is supplied to the electromagnets 77 to increase the overall magnetic flux, thereby maintaining the power factor at 100%. On the contrary, when the load decreases, a current is supplied to the electromagnets 77 in the reverse direction so as to decrease the overall magnetic flux, thereby maintaining the power factor at 100%.

Sixth Embodiment

Figure 28:
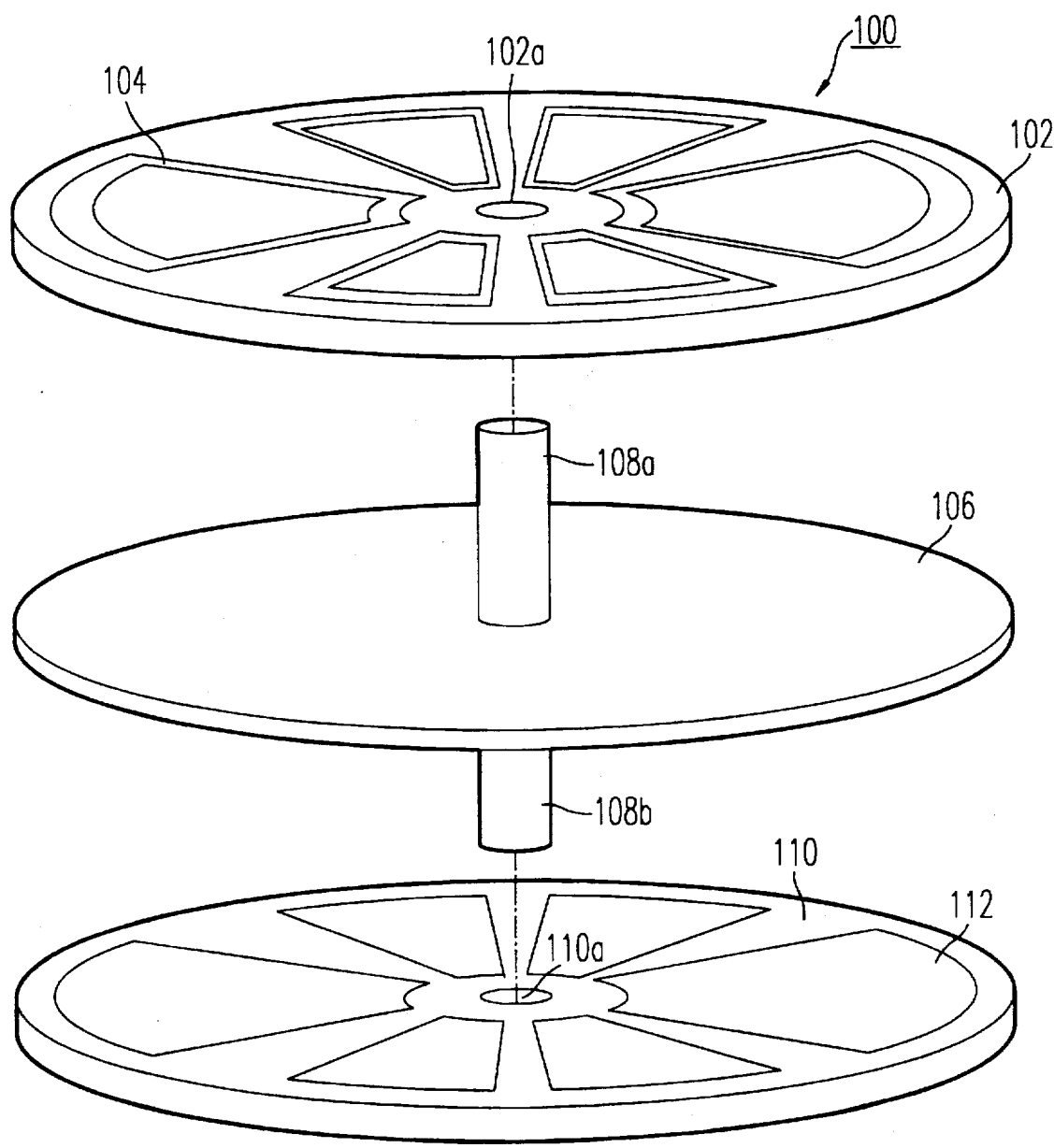
FIG. 28 is a perspective view of an induction motor according to a sixth embodiment of the present invention.

A disc type induction motor (a print motor) according to a sixth embodiment will be described with reference to FIG. 28. The print motor 100 according to the present embodiment is composed of a flat circular stator 102, a disc-like rotor 106, and a flat circular magnet disc 110. The stator 102 is provided with a through hole 102a formed at the center thereof, and a plurality of coils 104 are formed on the stator 102 such that the coils 104 surround the hole 102a. The rotor 106 is made of a conductive material such as aluminum, and a pair of shaft 108a and 108b are attached to the upper and lower sides of the rotor 106 at the center thereof such that they extend upward and downward, respectively. The magnet disc 110 is provided with a through hole 110a formed at the center thereof, and a plurality of magnets 112 are disposed in the magnet disc 110 such that the magnets 112 surround the hole 110a and are opposed to the coils 104. The rotor 106 is first combined with the stator 102 such that the upper shaft 108a of the rotor 106 is inserted into the through hole 102a of the stator 102, and the magnet disc 110 is further combined such that the lower shaft 108b is inserted into the through hole 110a of the magnet disc 110, thereby completing the assembly of the print motor 100.

In the print motor 100, when a current is supplied to the coils 104 of the stator 102, the magnetic flux from the coils 104 intersects the rotor 106. As a result, an induction current flows within the rotor 106, so that a thrust force is generated due to the mutual action between the induction current and the magnetic flux. This thrust force rotates the rotor 106. The magnets 112 are attracted by the magnetic flux from the coils 104, so that the magnet disc 110 rotates synchronously with the magnetic flux of the stator 102. Since the magnetic flux from the coils 104 extends toward the magnets 112, the magnetic flux perpendicularly crosses the rotor 106 so that an increased torque is generated in the rotor 106. In the print motor 100, it is considered that the power factor can arbitrarily be changed by adjusting the magnetic force of the magnets 112.

Seventh Embodiment

In the induction motor 20 according to the first embodiment, the torque can be increased. However, the starting torque is small, because the cylindrical inner rotor 34 generates a torque depending on the magnetic force of the permanent magnets 36 when the induction motor 20 is started. Therefore, it takes a considerably longer period of time for the inner rotor 34 to rotate in synchronous with the rotating magnetic field of the stator 22. Also, until the rotational speed of the inner rotor 34 reaches a synchronous speed, the lines of magnetic force 90 extending from the stator 22 to the permanent magnets 36 do not cross the secondary conductors 28a of the rotor 26 in the radial direction and fluctuates, so that a large torque pulsation is generated.

Figure 29:
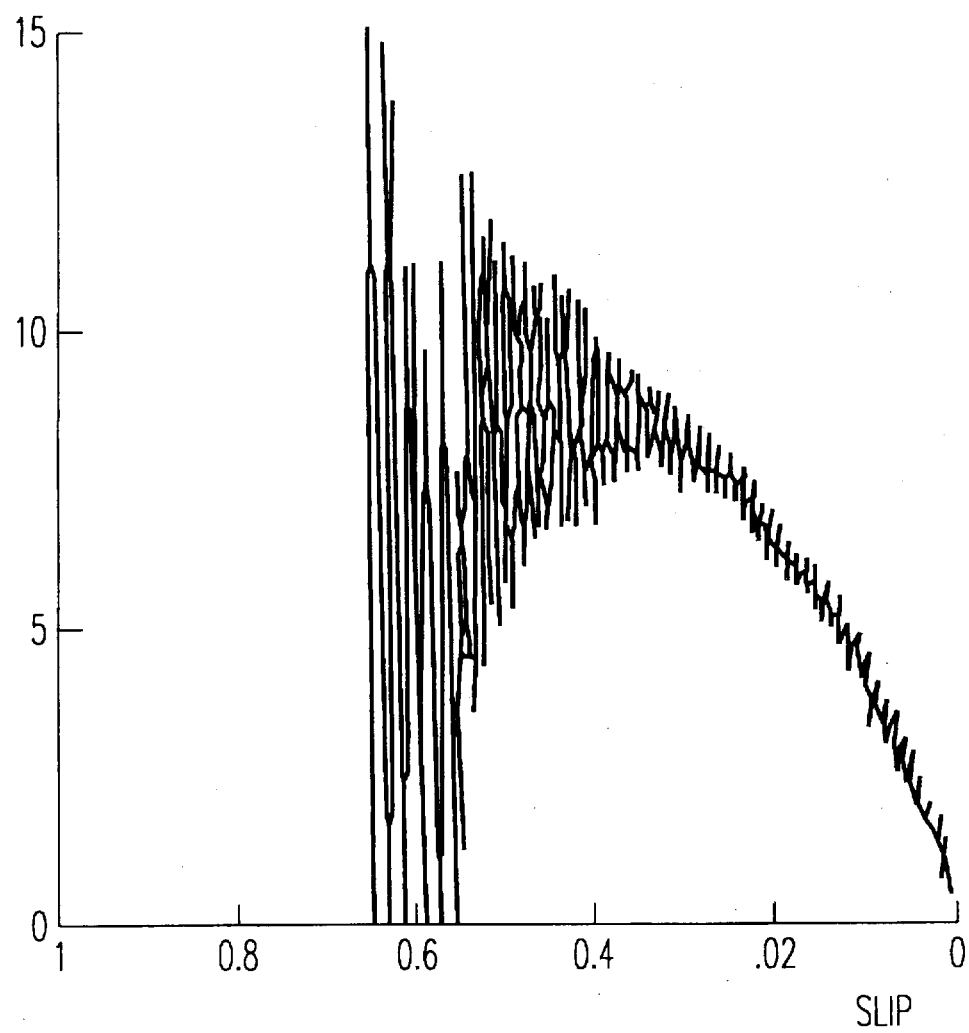
FIG. 29 is a graph showing the relationship between the slip and the torque of the induction motor according to the first embodiment.

In addition, such a torque pulsation is sometimes generated even in a stationary state. FIG. 29 shows the relationship between the slip and the torque of the induction motor of the first embodiment which was actually measured. The abscissa represents the slip while the ordinate represents the torque (N·m). As can been seen from FIG. 29, when the rotational speed is decreased and the slip reaches 0.3–0.4 where a stalling torque is generated, the torque pulsation becomes very large. Accordingly, in the case where the speed of the induction motor is controlled by vector control or the like and the speed is decreased to a speed near the speed at which a stalling torque is generated, the induction motor stops when the torque temporarily drops due to the pulsation. Therefore, the rotational speed cannot be decreased to a speed near the speed at which a stalling torque is generated. Accordingly, in practice, the lower limit of the rotational speed is set considerably higher than the rotational speed at which a stalling torque is generated.

Figure 30:
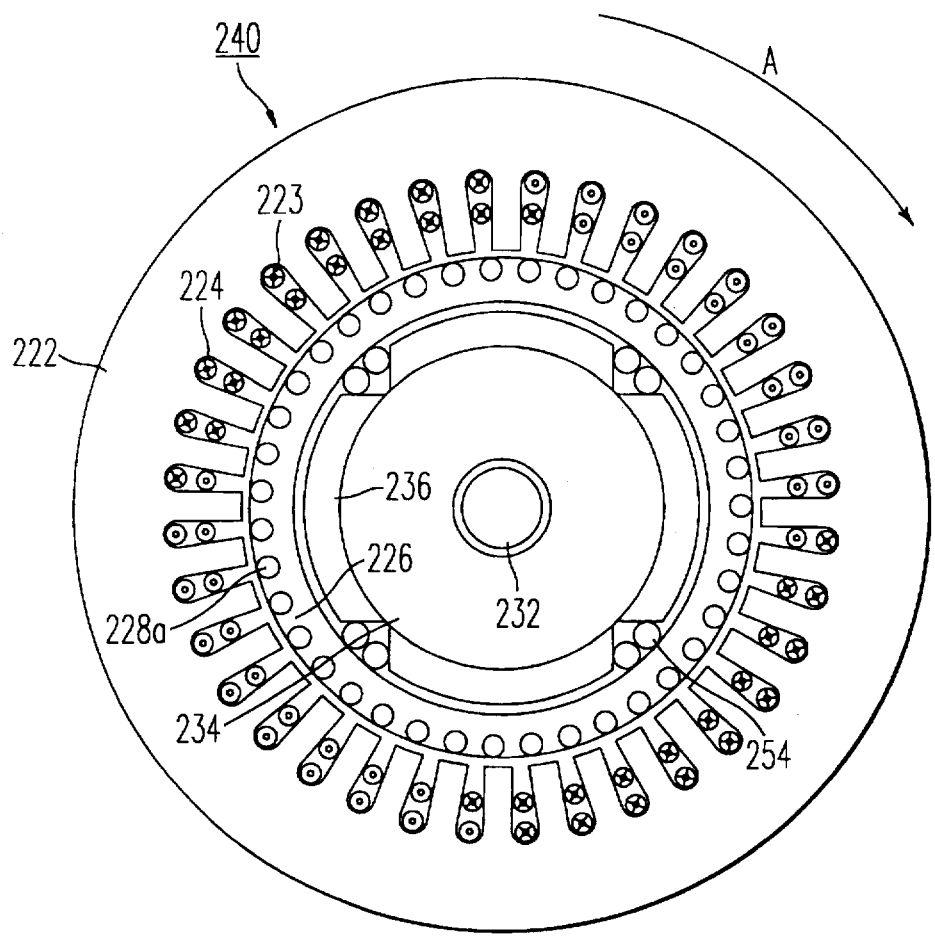
FIG. 30 is a transverse sectional view of an induction motor according to an seventh embodiment of the present invention.
Figure 31:
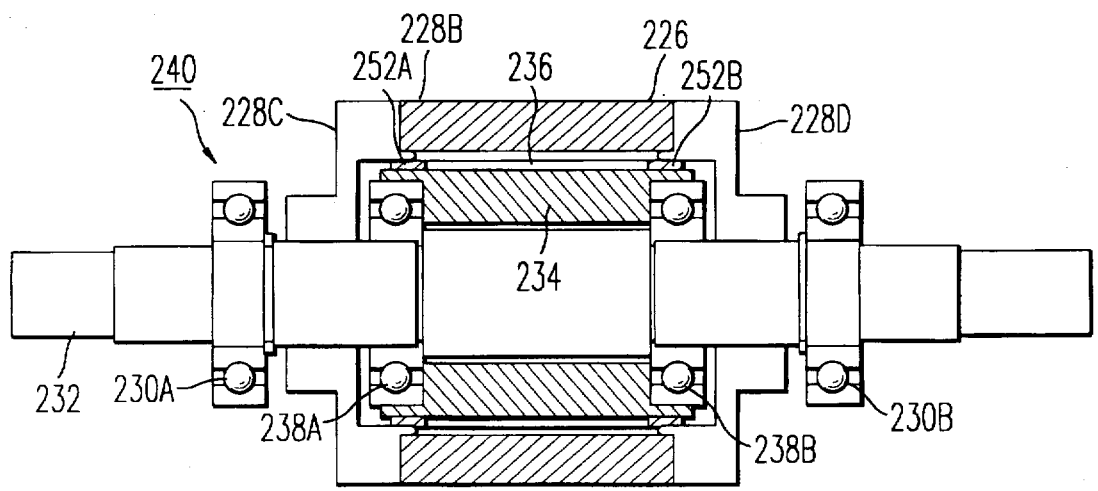
FIG. 31 is a longitudinal sectional view of a rotor of the induction motor shown in FIG. 30.
Figure 32:
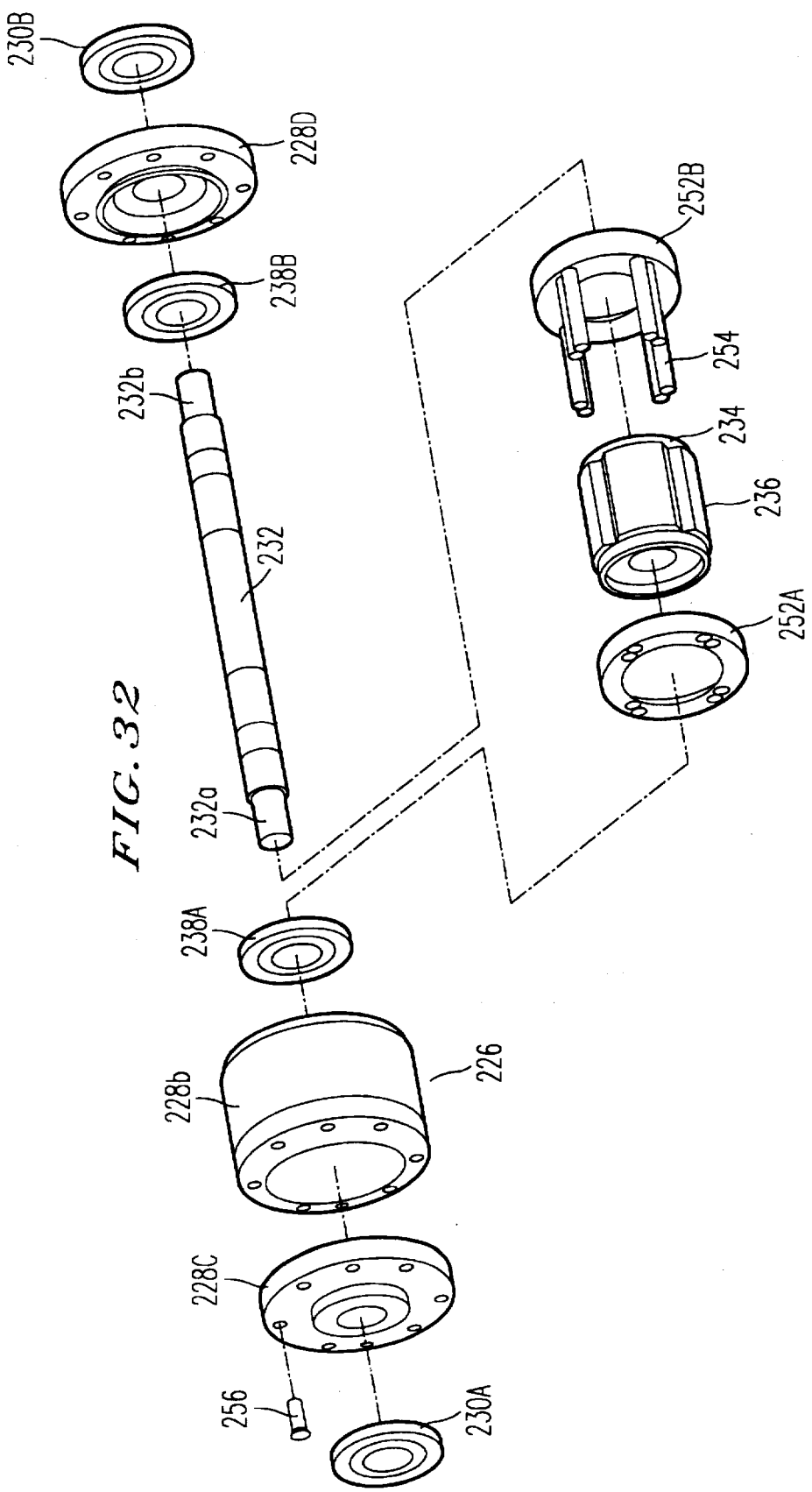
FIG. 32 is a perspective view of the rotor of the induction motor shown in FIG. 30 before assembly.

An induction motor of a seventh embodiment of the present invention can solve the above-described problems. FIG. 30 is a transverse sectional view of an induction motor 240 according to the present embodiment, and FIG. 31 is a longitudinal sectional view of a rotor 226 of the induction motor 240 shown in FIG. 30. FIG. 32 shows the state before the rotor 226 is assembled.

As shown in FIG. 30, a plurality of slots 224 are provided in the inner circumference of the stator 222, and windings 223 are disposed in the slots 224. This stator 222 is the same as that of a conventional squirrel-cage induction motor.

As shown in FIG. 31, the rotor 226 is fixed to the shaft 232 which is rotatably supported by a pair of bearings 230A and 230B. The rotor 226 is composed of a rotor member 228b in which a plurality of secondary conductors 228a are embedded (see FIG. 30), and frame rings 228C and 228D. A cylindrical inner rotor 234 made of steel is disposed inside the rotor 226 and is rotatably supported by the shaft 232 via a pair of bearings 238A and 238B. Four permanent magnets 236 the number of which corresponds to the number of poles of the induction motor 240 are attached to the outer circumference of the inner rotor 234.

As shown in FIG. 30, two conductive bars 254 are disposed between every two adjacent permanent magnets 236. The conductive bars 254 form a cage winding which will be described later. The manner of assembling the rotor 226 which includes conductive bars 254 will be described with reference to FIG. 32. The inner rotor 234 to which the permanent magnets 236 are attached is first sandwiched between an end ring 252B from which eight conductive bars 254 project, and another end ring 252A. At this time, the conductive bars 254 are positioned between adjacent two permanent magnets 236. Subsequently, a bearing 238A is attached from one end 232a of the shaft 232, and the inner rotor 234 having the conductive bars 254 and a bearing 238B are successively attached from the other end 232b of the shaft 232. With this assembly, the inner rotor 234 is rotatably supported by the shaft 232 through the pair of bearings 238A and 238B. After that, the rotor member 228b and a frame ring 228C are attached from the one end 232a of the shaft 232, and a frame ring 228D is attached from the other end 232b of the shaft 232. The frame rings 228C and 228D are then fixed to the rotor member 228b with bolts 256 to complete the rotor 226. As a result, the rotor 226 is fixed to the shaft 232. Finally, the bearing 230A is attached from the one end 232a of the shaft 232 and the bearing 230B is attached from the other end 232b of the shaft 232. The shaft 232 is then supported by the bearings 230A and 230B for free rotation with respect to the stator 222.

The operation of the induction motor 240 will be described with reference to FIG. 30. When three-phase alternating currents are supplied to the windings 223 of the stator 222, a magnetic field which rotates in a direction indicated by arrow A is generated. The magnetic flux of the rotating magnetic field passes across the conductive bars 254 which are attached to the inner rotor 234 and which form a cage winding, so that a speed electromotive force is generated in the conductive bars 254. As a result, a current flows within the conductive bars 254 due to the speed electromotive force, and a torque is generated due to the mutual action between the current and the magnetic flux so that the inner rotor 234 starts to be rotated in the same direction as the direction of rotation of the magnetic field.

Simultaneously, when the magnetic flux of the rotating magnetic field passes across the secondary conductors 228a of the rotor 226, a speed electromotive force is generated in each secondary conductor 228a. As a result, a current flows within the secondary conductors 228a due to the speed electromotive force, and a torque is generated due to the mutual action between the current and the magnetic flux so that the rotor 226 starts to be rotated in the same direction as the direction of rotation of the magnetic field. The rotational speed of the rotor 226 gradually increases and reaches a speed which is slightly lower than the rotational speed of the rotating magnetic field of the stator 222 and at which a slip is produced.

When the rotational speed of the inner rotor 234 increases and the relative speed thereof with respect to the rotating magnetic field decreases, the induction current induced in the conductive bars 254 decreases, so that the torque decreases. However, since the permanent magnets 236 attached to the inner rotor 234 are attracted by the magnetic force generated in the stator 222, the inner rotor 234 rotates such that it is completely synchronized with the rotating magnetic field generated in the stator 222. To be exact, the inner rotor 234 rotates with a slight angular delay. In the induction motor 240 according to the present embodiment, the magnetic flux is directed to the opposite permanent magnets 236. Accordingly, the magnetic flux crosses the secondary conductors 228a of the rotor 226 in the radial direction, so that the torque generated at the rotor 226 increases.

Also, since the conductive bars 254 which form a cage wiring are attached to the inner rotor 234, a large torque acts on the inner rotor 234 when the induction motor 240 is started. Accordingly, the synchronization between the inner rotor 234 and the rotating magnetic field can be achieved in a shortened period of time, so that the torque pulsation during the starting period can be decreased in a shortened period of time and the starting torque becomes large.

Eighth Embodiment

Figure 33:
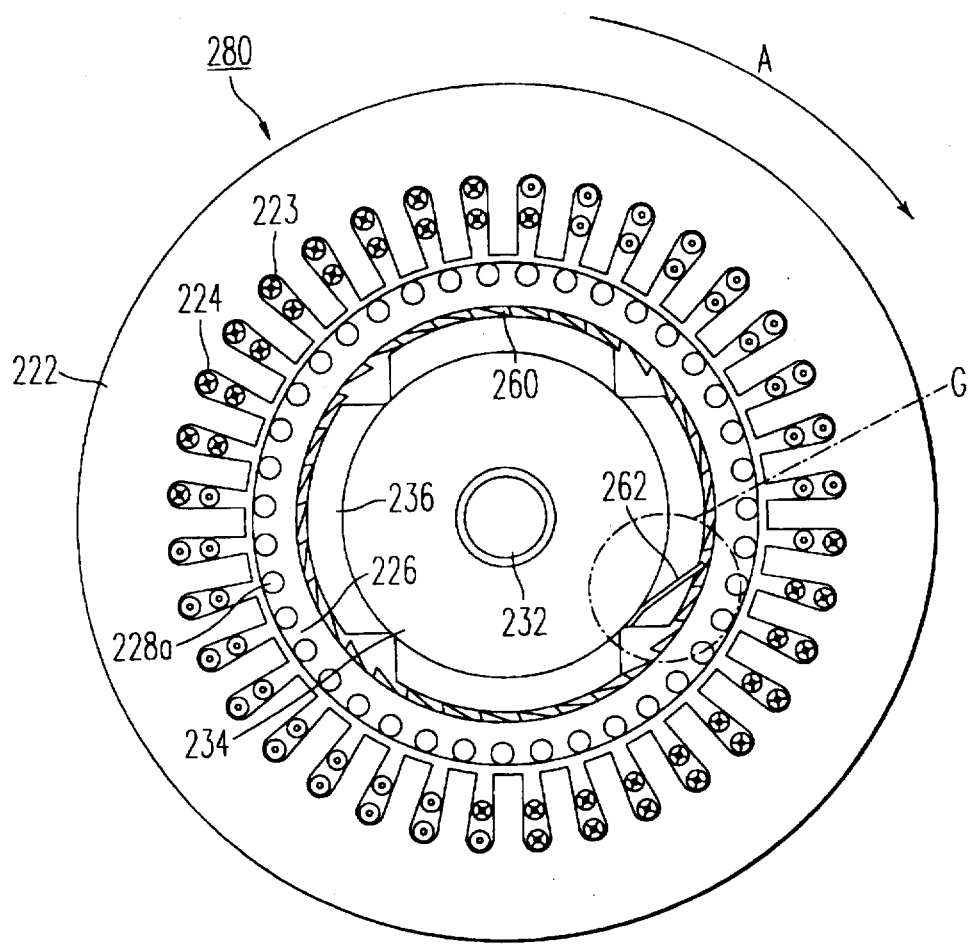
FIG. 33 is a transverse sectional view of an induction motor according to a eighth embodiment of the present invention.

An induction motor 280 according to a eighth embodiment of the present invention will be described with reference to FIGS. 33 through 35. As shown in FIG. 33, a plurality of slots 224 are provided in the inner circumference of the stator 222, and windings 223 are disposed in the slots 224. This stator 222 is the same as that of a conventional squirrel-cage induction motor.

Figure 34:
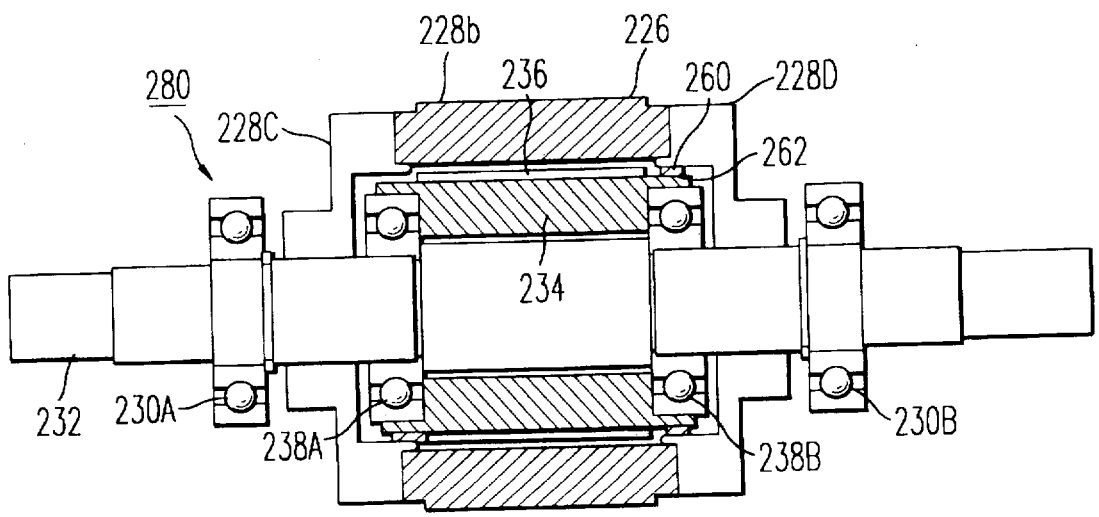
FIG. 34 is a longitudinal sectional view of a rotor of the induction motor shown in FIG. 33.
Figure 35:
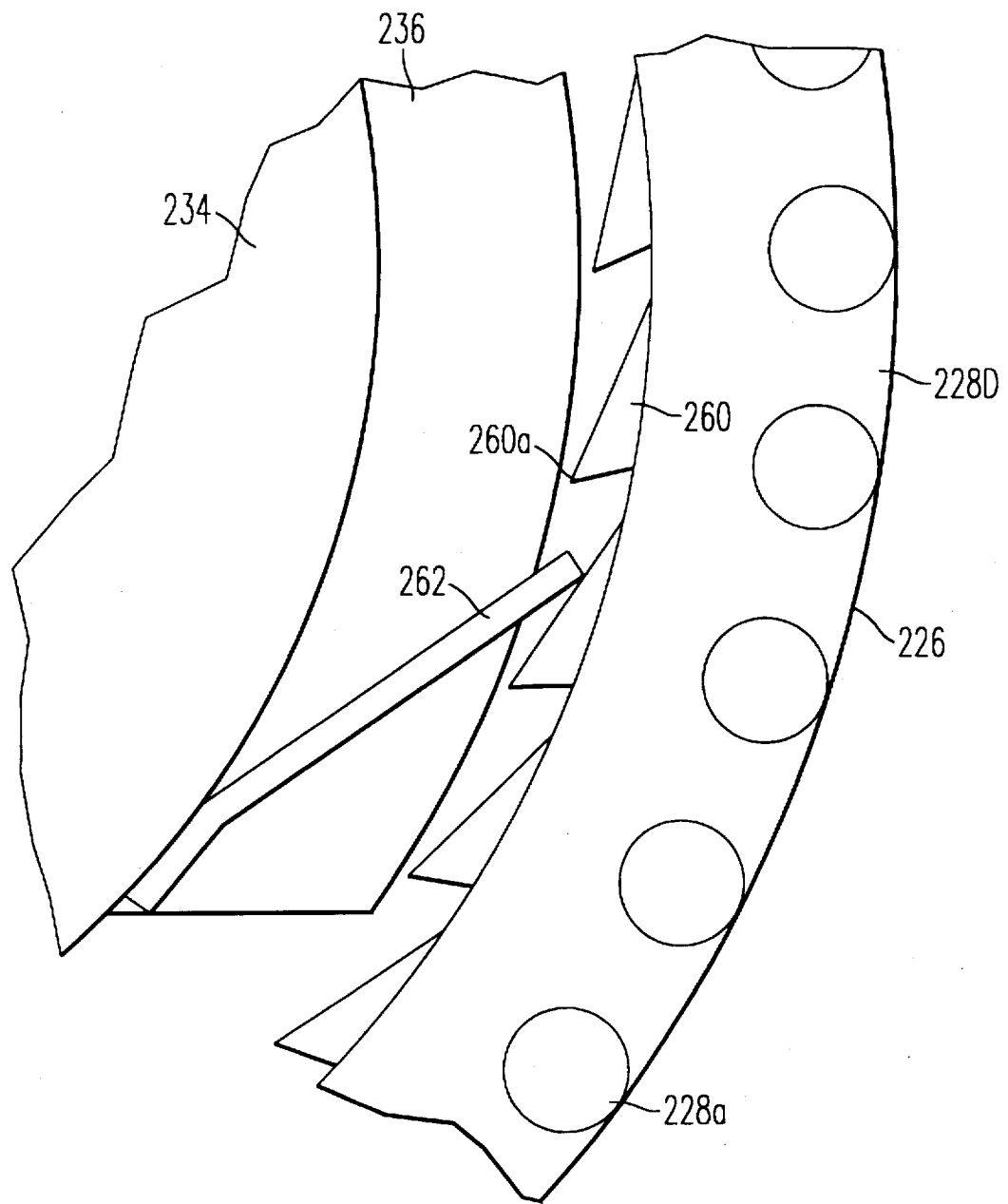
FIG. 35 is an enlarged sectional view of a portion of the rotor indicated by circle G in FIG. 33.

As shown in FIG. 34, the rotor 226 is fixed to the shaft 232 which is rotatably supported by a pair of bearings 230A and 230B. The rotor 226 is composed of a rotor member 228b, and frame rings 228C and 228D. As shown in FIG. 33, a plurality of secondary conductors 228a are embedded in the rotor 226. A cylindrical inner rotor 234 made of steel is disposed inside the rotor 226 and is rotatably supported by the shaft 232 via a pair of bearings 238A and 238B. Four permanent magnets 236 the number of which corresponds to the number of poles of the induction motor 280 are attached to the outer circumference of the inner rotor 234.

As shown in FIG. 33, ratchet teeth 260 are formed on the inner circumference of the frame ring 228D of the rotor 226. Also, a ratchet plate 262 is attached to the inner rotor 234 at an axial position corresponding to the ratchet teeth 260. FIG. 35 is an enlarged view of a ratchet mechanism composed of the ratchet teeth 260 and the ratchet plate 262. The ratchet teeth 260 are formed such that the tip 260a of each ratchet tooth 260 is directed in the rotational direction of the inner rotor 234. When the inner rotor 234 rotates in the clockwise direction in FIG. 35 faster than the rotor 226, the ratchet plate 262 attached to the inner rotor 234 slides over the ratchet teeth 260 while being bent. On the contrary, when the rotational speed of the inner rotor 234 becomes equal to or less than the rotational speed of the rotor 226, the ratchet plate 262 engages with the ratchet teeth 260 so as to prevent the inner rotor 234 from lagging behind the rotor 226.

The operation of the induction motor 280 will be described with reference to FIG. 33. When three-phase alternating currents are supplied to the windings 223 of the stator 222, a magnetic field which rotates in a direction indicated by arrow A is generated. The magnetic flux of the rotating magnetic field passes across the secondary conductors 228a of the rotor 226, and a speed electromotive force is thus generated in each secondary conductor 228a. As a result, a current flows in the secondary conductors 228a due to the speed electromotive force, and a torque is generated due to the mutual action between the current and the magnetic flux so that the rotor 226 is rotated in the same direction as the direction of rotation of the magnetic field. When the rotation of the rotor 226 starts, the inner rotor 234 is also rotated by the action of the ratchet mechanism. The rotational speed of the rotor 226 gradually increases and reaches a speed which is slightly lower than the rotational speed of the rotating magnetic field of the stator 222 and at which a slip is produced.

When the rotational speed of the inner rotor 234 increases, the permanent magnets 236 are attracted by the magnetic force generated in the stator 222, the inner rotor 234 rotates while being completely synchronized with the rotating magnetic field generated in the stator 222. To be exact, the inner rotor 234 rotates with a slight angular delay. In the induction motor 280 according to the present embodiment, the magnetic flux is directed to the opposite permanent magnets 236. Accordingly, the magnetic flux crosses the secondary conductors 228a of the rotor 226 in the radial direction, so that the torque generated at the rotor 226 increases.

Since the ratchet mechanism is provided to prevent the inner rotor 234 from lagging behind the rotor 226, the rotation of the inner rotor 234 is started by the rotor 226, so that the synchronization between the inner rotor 234 and the rotating magnetic field can be achieved in a shortened period of time. Accordingly, the torque pulsation during the starting period can be decreased in a shortened period of time, so that the starting characteristic can be improved.

Also, when the slip is increased by vector control or the like so as to control the rotational speed of the induction motor 280, the rotation of the magnetic field of the stator 222 and the rotation of the inner rotor 234 may get out of the synchronized state due to the load change and the like. Even in such a case, the inner rotor 234 is prevented from excessively lagging behind the rotating magnetic field of the stator 222 by the action of the ratchet mechanism. Accordingly, the magnetic flux of the stator 222 stably extends toward the opposite permanent magnets 236 which are opposed to the stator 222, and no torque pulsation is generated. This makes it possible to decrease the rotational speed to a speed near the speed at which a stalling torque is generated.

In the second embodiment, the ratchet teeth 260 are provided on the rotor 226 and the ratchet plate 262 is attached to the inner rotor 234. However, it is possible to attach the ratchet plate 262 to the rotor 226 and to provide the ratchet teeth 260 on the inner rotor 234.

Obviously, numerous modifications and variations of the present invention are possible in light of the above teachings. It is therefore to be understood that within the scope of the appended claims, the present invention may be practiced otherwise than as specifically described herein.

What is claimed is:

1. An induction motor comprising:

a stator for generating a rotating magnetic field;

a rotor fixed to a shaft for rotation therewith inside said stator, said rotor including a plurality of spaced apart conductors;

a cylindrical member disposed within an inner space defined in said rotor and rotatably supported by said shaft:

magnets attached to the circumference of said cylindrical member such that said magnets face the rotating magnetic field; and a spacer positioned on said shaft which spacer moves said magnets axially with respect to said stator and said rotor and in the axial direction of said shaft so as to change overlapping areas between poles of said stator and said magnets.

2. An induction motor comprising:

a stator for generating a rotating magnetic field;

a rotor fixed to a shaft for rotation therewith inside said stator, said rotor including a plurality of spaced apart conductors which generate a force as a function of said rotating magnetic field and said force having a component which is tangential to the rotational direction of said rotor;

a cylindrical member disposed within an inner space defined in said rotor and rotatably supported by said shaft: and electromagnets and permanent magnets attached to the circumference of said cylindrical member such that said electromagnets face the rotating magnetic field whereby said electromagnets redirect a path of said rotating magnetic field in order to increase said tangential component of said force generated in said spaced apart conductors; and a spacer positioned on said shaft which spacer moves said electromagnet and said permanent magnets axially with respect to said stator and said rotor and in the axial direction of said shaft so as to change overlapping areas between poles of said stator and said electromagnet and said permanent magnets.

3. An induction motor comprising:

a stator for generating a rotating magnetic field;

a rotor fixed to a shaft for rotation therewith inside said stator, said rotor including a plurality of spaced apart conductors which generate a force as a function of said rotating magnetic field and said force having a component which is tangential to the rotational direction of said rotor;

a cylindrical member disposed within an inner space defined in said rotor and rotatably supported by said shaft;

magnets attached to the circumference of said cylindrical member such that said magnets face the rotating magnetic field whereby said magnets redirect a path of said rotating magnetic field in order to increase said tangential component of said force generated in said spaced apart conductors; and means for synchronizing the movement of said cylindrical member and said rotor including a rachet mechanism for preventing said cylindrical member from lagging behind said rotor.

\* \* \* \* \*

UNITED STATES PATENT AND TRADEMARK OFFICE
CERTIFICATE OF CORRECTION

PATENT NO. : 5,723,928
DATED : March 3, 1998
INVENTOR(S) : Kouji IMAI, et al.

It is certified that error appears in the above-identified patent and that said Letters Patent is hereby corrected as shown below:

On the title page, item [75], the second inventor's address should be:

[75]
--Nuio Tsuchida, 5-227-16, Kurosawadai, Midori-ku, Nagoya-shi, Aichi-ken;--

Signed and Sealed this

Fifth Day of May, 1998

Attest:

BRUCE LEHMAN

Attesting Officer

Commissioner of Patents and Trademarks